United States Patent [19]
Gunji et al.

[11] Patent Number: 5,483,536
[45] Date of Patent: Jan. 9, 1996

[54] RING NETWORK CONCENTRATOR

[75] Inventors: Yoshinori Gunji, Moriguchi; tetsuya Wada, Suita; Rieko Nakajima, Koube; Hiroshi Doi, Kyoto; Taku Matsuda, Nara, all of Japan

[73] Assignee: Matsushita Electric Industrial Co., Ltd., Osaka, Japan

[21] Appl. No.: 263,135

[22] Filed: Jun. 21, 1994

[30] Foreign Application Priority Data

Jun. 22, 1993 [JP] Japan .................................. 5-150298

[51] Int. Cl.⁶ .......................... H04L 12/42; H04L 12/46
[52] U.S. Cl. ...................... 370/85.14; 370/17; 370/60; 370/79
[58] Field of Search ................... 370/17, 53, 56, 370/60, 60.1, 16.1, 79, 16, 85.5, 85.12, 85.14, 85.15, 94.1, 94.2, 94.3; 340/825.03, 827, 825.05, 825.06

[56] References Cited

U.S. PATENT DOCUMENTS

| 5,042,030 | 8/1991 | Grima et al. ......................... 370/85.12 |
| 5,101,405 | 3/1992 | Bekki et al. ......................... 370/85.15 |
| 5,179,548 | 1/1993 | Sandesara ........................... 370/85.12 |
| 5,341,364 | 8/1994 | Marra et al. ......................... 370/16.1 |
| 5,383,191 | 1/1995 | Hobgood et al. ....................... 370/56 |

OTHER PUBLICATIONS

"Michael Franzen, FDDI concentrators and how they work together with other FDDI network components, computer networks and ISDN Systems" 23(1991), pp. 51–55.

*Primary Examiner*—Hassan Kizou
*Attorney, Agent, or Firm*—Price, Gess & Ubell

[57] ABSTRACT

A ring network concentrator for dynamically changing the design of a network system depending on conditions of a ring network attached to the network concentrator. The ring network concentrator partitions traffic of a ring trunk network into a plurality of ring networks by dynamically changing connection patterns at configuration switches. The configuration switches connect ports, media access control units, and internal paths according to a communication protocol of a packet to be transferred and a traffic amount.

31 Claims, 20 Drawing Sheets

RING NETWORK CONCENTRATOR

BACKGROUND OF THE INVENTION

(1) Field of the Invention

The present invention relates to a ring network concentrator for connecting between independent ring networks, and building a network system from the ring networks.

(2) Description of the Related Art

A ring network is frequently employed for a high-speed data communication. A local area network is an example of such ring network. This type of ring network, a FDDI (Fiber Distributed Data Interface) which provides a data transmission rate of 100 mega bit per second (Mbps) over fiber-optic cables, has become an ISO standard recently, i.e. ISO9314. The FDDI 93014 is defined by a PHY (Physical Medium Dependent), an MAC (Media Access Control), a PMD (Physical Medium Dependent), and a SMT (Station Management). Among these components, only the SMT is still under discussion, and an ANSI (American National Standards Institute) Draft Proposed X3T9/1992-067 FDDI SMT Rev 7.2 has been issued so far.

The typical configuration of a ring network system basing upon the FDDI will be discussed. The FDDI carries out a high-speed packet communication as a trunk network, and a packet relay device, such as Ethernet accommodates a branch network for carrying out a low-speed packet communication. Conventionally, the FDDI is connected to the packet relay device, and terminal stations are connected to the branch network.

Because of a recent development in performance of a terminal station, a high speed data communication is demanded even at a multi-media application, such as image data or voice data. To meet this demand, a concentrator for directly linking terminal stations to the FDDI is required.

The capabilities and design of the FDDI concentrator is described in "Michael Franzen, FDDI concentrators and how they work together with other FDDI network components, Computer Networks and ISDN Systems 23 (1991), p. 51–55). In the Franzen's article, the basic internal configuration of the FDDI concentrator is determined in accordance with the SMT (Station Management) of ISO9314. More specifically, the FDDI concentrator is constructed from internal paths, ports, MACs (Media Access Control), and configuration switches. The internal paths include three internal paths, i.e. a primary path, a secondary path, and a local path, to send a packet.

The ports include a peer port which is associated with dual rings of a ring trunk network, and a master port which is associated with a single ring of a ring branch network, and a packet is sent on/received from the ring network. Each MAC performs a transmission/reception of packet data, and a ring management. One configuration switch is provided for each port and MAC. The configuration switch decides a connection pattern between ports, MACs, and internal paths to establish a communication channel. Although it is described in the Franzen's article that an MAC is directly inserted into an internal path, this has been changed in that a configuration switch is prepared for each MAC since the introduction of FDDI SMT Rev 7.2. To build a ring network system, the user of the FDDI concentrator presets a connection pattern at each configuration switch indicating which internal path to be connected with the port and the MAC. Thus, the user can set a connection between ring networks and internal paths in the FDDI concentrator, and placement of MACs at will. Therefore, the design of a ring network system can be set freely.

However, the conventional ring network concentrator has a drawback. As stated in the above, a connection pattern at each configuration switch is set beforehand. However, this does not always meet a dynamic change in the ring network which occurs in a moment.

SUMMARY OF THE INVENTION

Accordingly, it is a an object of the present invention to provide a ring network concentrator which is capable of changing the configuration of a network system dynamically according to conditions of its ring networks.

The above object may be fulfilled by a ring network concentrator comprising ports for transmitting/receiving packets to/from ring networks into which the ports are configured, a plurality of internal paths for transferring the packets, and configuration switches for deciding connection patterns between the ports and the internal paths, and changing the connection patterns according to a communication protocol of a packet sent on the ring network and a measured traffic amount so as to change the design of a ring network system constructed from the ring networks.

In the above construction, the ring network concentrator judges a condition of the ring network connected to each port according to a communication protocol of a packet sent on an internal path or a traffic amount, and changes connection patterns at the configuration switches dynamically depending on the condition. Therefore, in a ring network system constructed by the ring network concentrator, when the traffic amount of the packets sent on a ring trunk network of single ring construction increases, the ring network concentrator changes the connection patterns at the configuration switches to partition the packets into a plurality of networks. By doing so, the maximum data amount in the ring network system is increased, and the traffic amount of the packets sent on the ring trunk network can be suppressed. Also, when packets sent on the ring trunk network of single ring construction include a plurality of communication protocols, the ring network concentrator partitions the packets into a plurality of ring networks depending on communication protocols in changing the connection patterns at the configuration switches. Thus, each communication protocol uses a ring network exclusively, so that a data communication of the entire ring network is not annoyed by data communication of other communication protocols. As a result, reliability of data communications by terminal stations is increased.

To conclude the advantage of the present invention, the conventional ring network concentrator selects connection patterns at configuration switches statically, so that the design of a network system built thereby is determined regardless of current conditions of the networks. On the other hand, the ring network concentrator of the present invention changes connection patterns at configuration switches dynamically according to current conditions of the networks, so that the most desirable design of a network system can be realized at any moment.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENTS

A first embodiment of the present invention is described hereunder.

Figure 1:
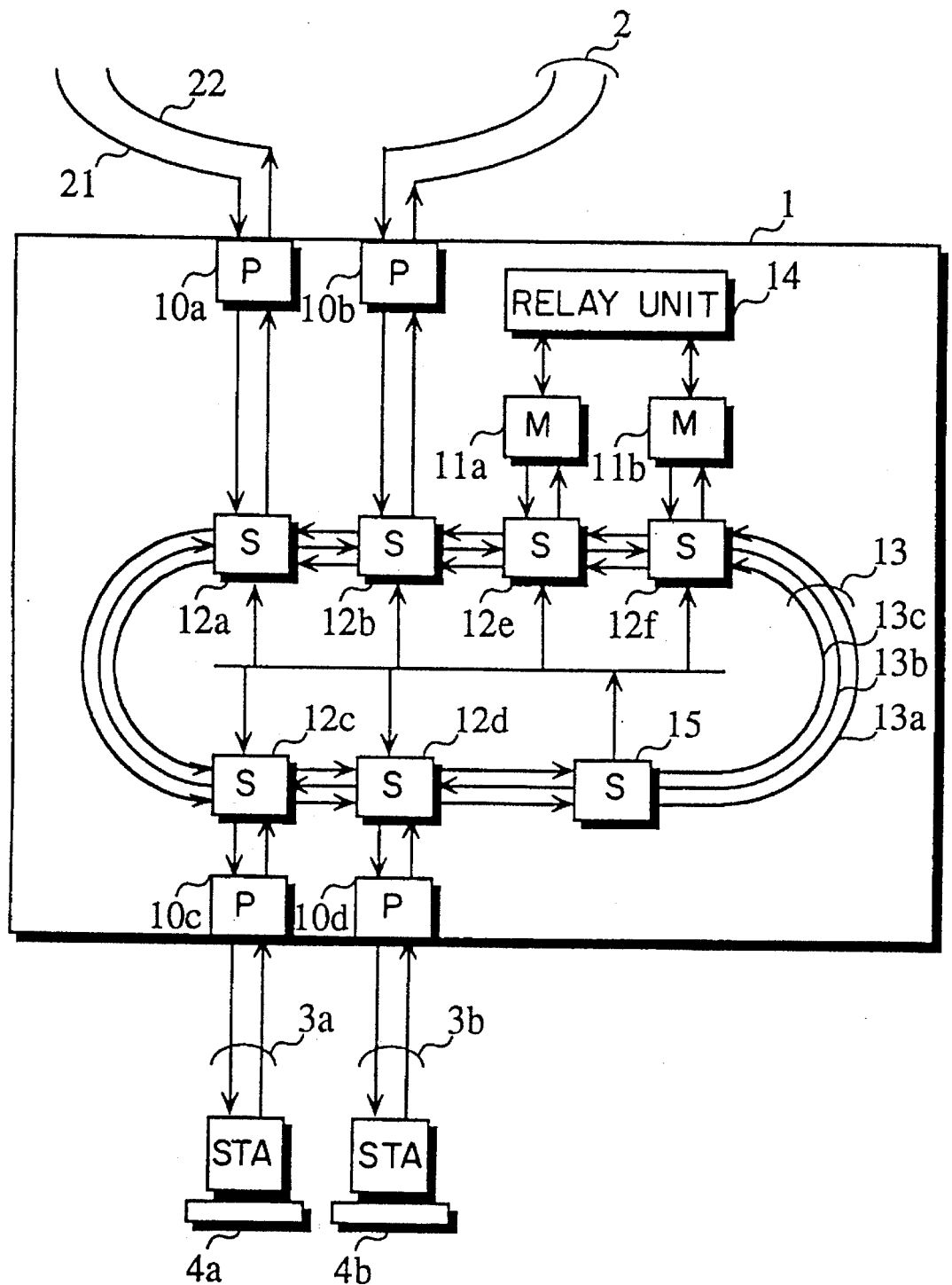
FIG. 1 shows the configuration of a ring network concentrator in a first embodiment of the present invention.

A ring network concentrator 1 in FIG. 1 comprises a port 10 (10a, 10b, 10c, 10d), a media access control unit 11 (11a, 11b), a configuration switch 12 (12a, 12b, 12c, 12d, 12e, 12f), an internal path 13 (13a, 13b, 13c), a packet data relay unit 14, and a traffic amount measuring unit 15. The thus constructed ring network concentrator 1 constructs a ring network system from a ring trunk network 2 and a ring branch network 3 (3a, 3b).

The port 10 is connected to the ring trunk network 2 or the ring branch network 3 (3a, 3b) to transmit/receive a packet.

The media access control unit 11 controls the ring configuration of a ring network, and carries out a transmission/reception of packet data.

The configuration switch 12 decides a connection pattern between the port 10, the media access control unit 11, and the internal path 13. The switches 12a, 12b are associated with the ports 10a, 10b connected to the ring trunk network respectively; the switches 12c, 12d are associated with the ports 10c, 10d connected to the ring branch network respectively; and the remaining switches 12e, 12f are connected to the media access control units 11a and 11b respectively. The detailed configuration of the configuration switch 12 will be given later.

The internal path 13 comprises the primary path 13a, secondary path 13b, and the local path 13c to send a packet. Although FIG. 1 shows only one local path 13c, a plurality of local paths can be employed depending on needs.

The packet data relay unit 14 is connected to the media access control units 11a, 11b to relay packet data.

The traffic amount measuring unit 15 measures the traffic amount of packets to be passed to the internal path 13, and requests of the configuration switch 12 to change its connection pattern as referring to the measured traffic amount. The detailed configuration of the traffic amount measuring unit 15 will be given later.

The ring trunk network 2 is a dual path made up of a main ring 21 and a sub ring 22. Under ordinary operating conditions, a packet is sent to nodes on the main ring 21, and the sub ring 22 provides redundancy as a backup ring. When a break occurs in the main ring 21, on the other hand, the ring trunk network 2 can reconfigure itself around the faulty point by folding the main ring 21 back to the sub ring 22.

The ring branch network 3 (3a, 3b) is a single communication path for linking the ring network concentrator 1 and the terminal stations (4a, 4b) on which a packet is sent.

Figure 2:
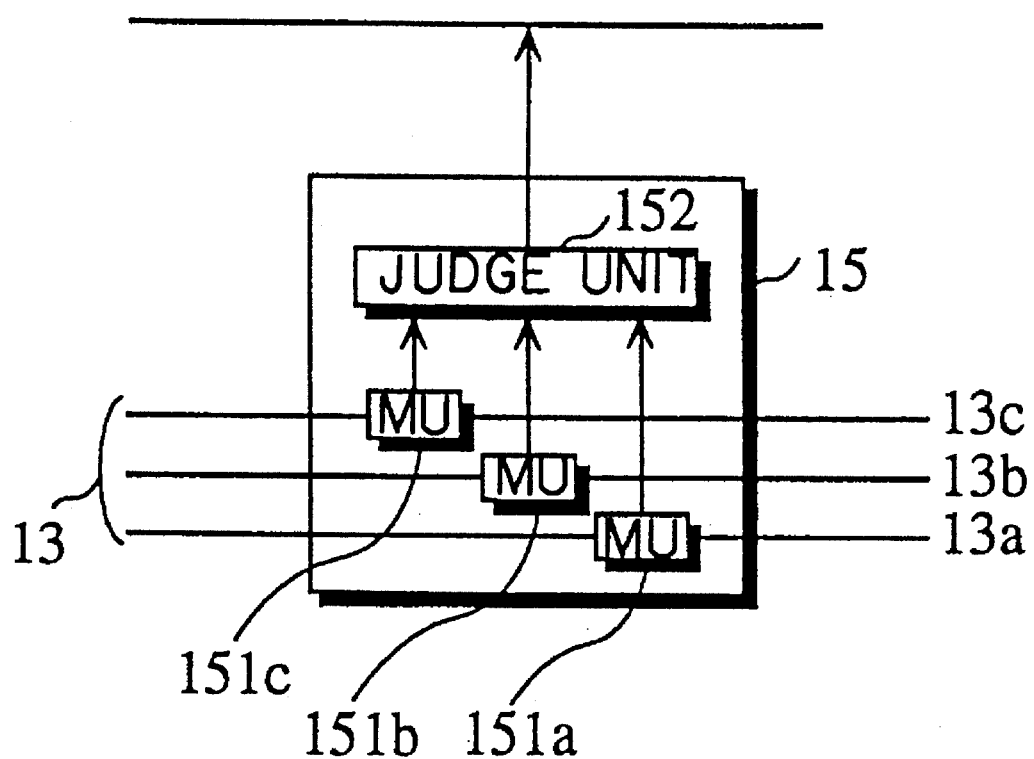
FIG. 2 shows the configuration of a traffic amount measuring unit in the ring network concentrator of FIG. 1.

As shown in FIG. 2, the traffic amount measuring unit 15 comprises an internal path measuring unit 151 (151a, 151b, 151c) and a connection pattern judge unit 152. The internal path measuring unit 151 measures the traffic amount of packets which have been sent on the internal path per a time unit, and notifies the connection pattern judge unit 152 of the measured traffic amount.

Figure 3:
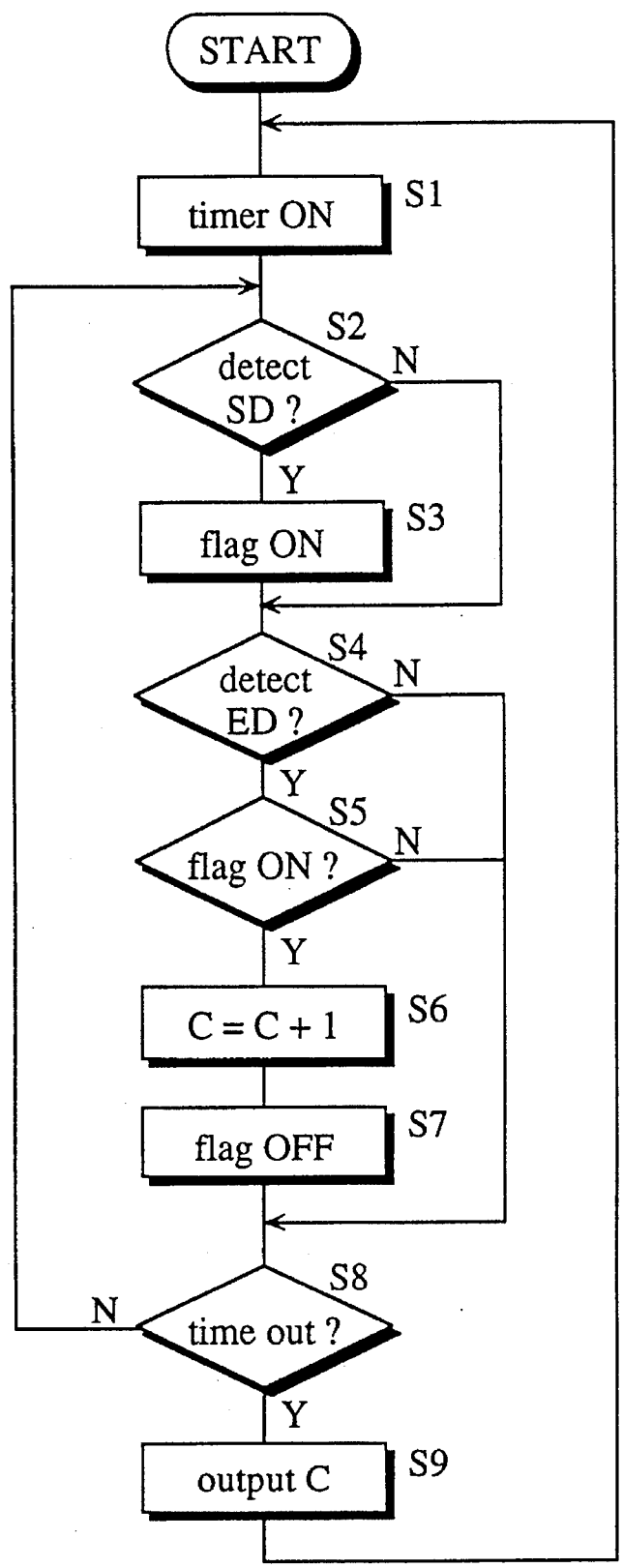
FIG. 3 is a flow chart showing a measurement of traffic amount.

FIG. 3 shows the detailed operation of the internal path measuring unit 151. A timer is turned on (S1). Up to a time-out of the timer (S8), a signal representing a head (SD) and an end (ED) of each packet are detected (S2, S4). When the head signal SD is detected, a flag F is set (S3). If the end signal SE is detected while the flag F is being set, a packet counting number C is incremented by one (S5, S6), then the flag F is reset (S7). The packet counting number C detected at time-out of the timer is notified to the connection pattern judge unit 152 as traffic amount per a time unit (S9).

Figure 4:
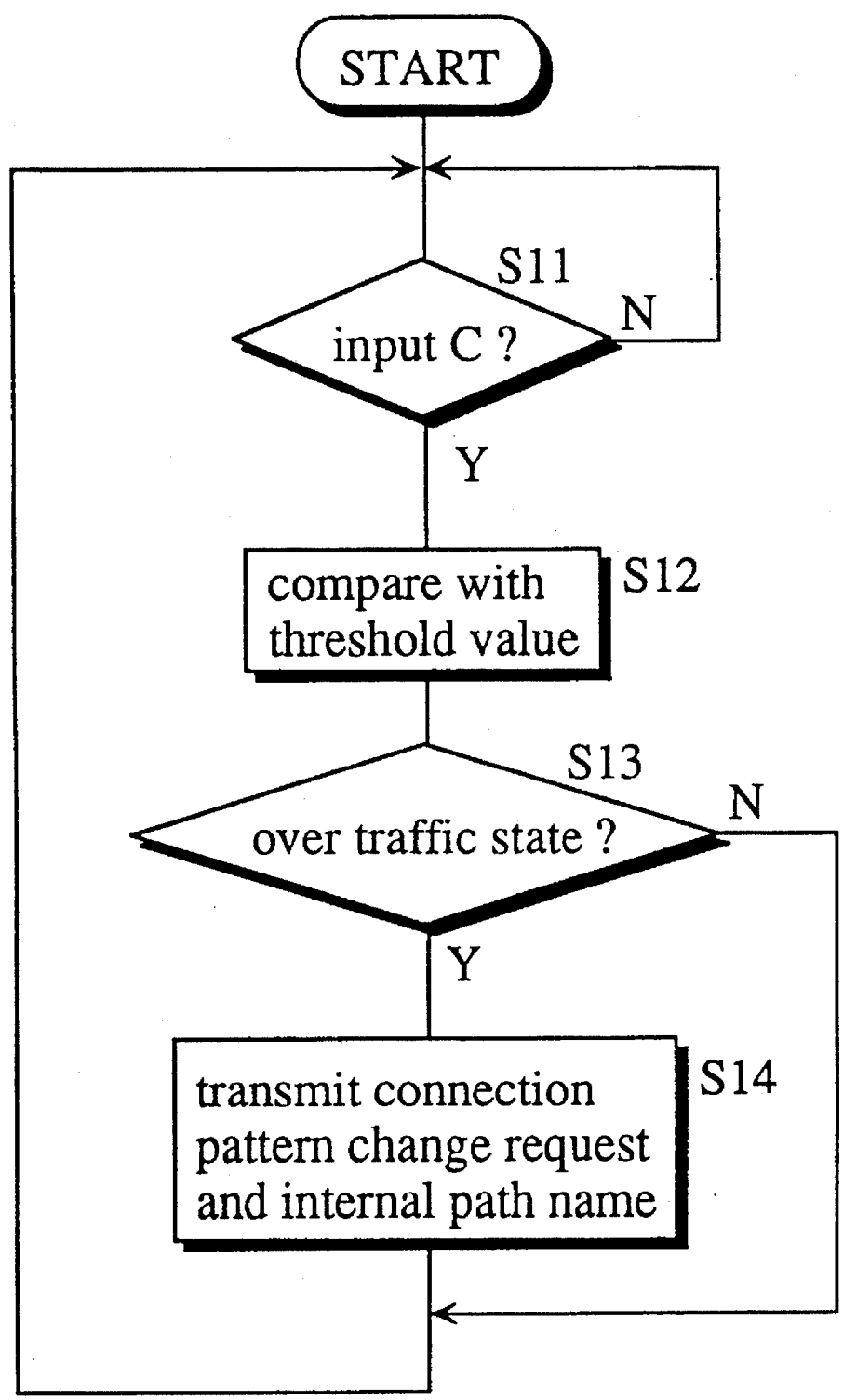
FIG. 4 is a flow chart showing a generation of a connection pattern change request.

The connection pattern judge unit 152 judges if the traffic amount notified by the internal path measuring unit 151 exceeds a predetermined threshold value. FIG. 4 shows the detailed operation of the connection pattern judge unit 152. When receiving traffic amounts Ca, Cb, Cc from the internal path measuring units 151a, b, c respectively (S11), the connection pattern judge unit 152 compares these amounts with a predetermined threshold value (S12). When judging that an internal path is in over traffic state (S13), the connection pattern judge unit 152 provides a connection pattern change request and notifies the name of the internal path (13a, 13b, 13c) which is in the over traffic state to every configuration switch 12 (S14).

Figure 5:
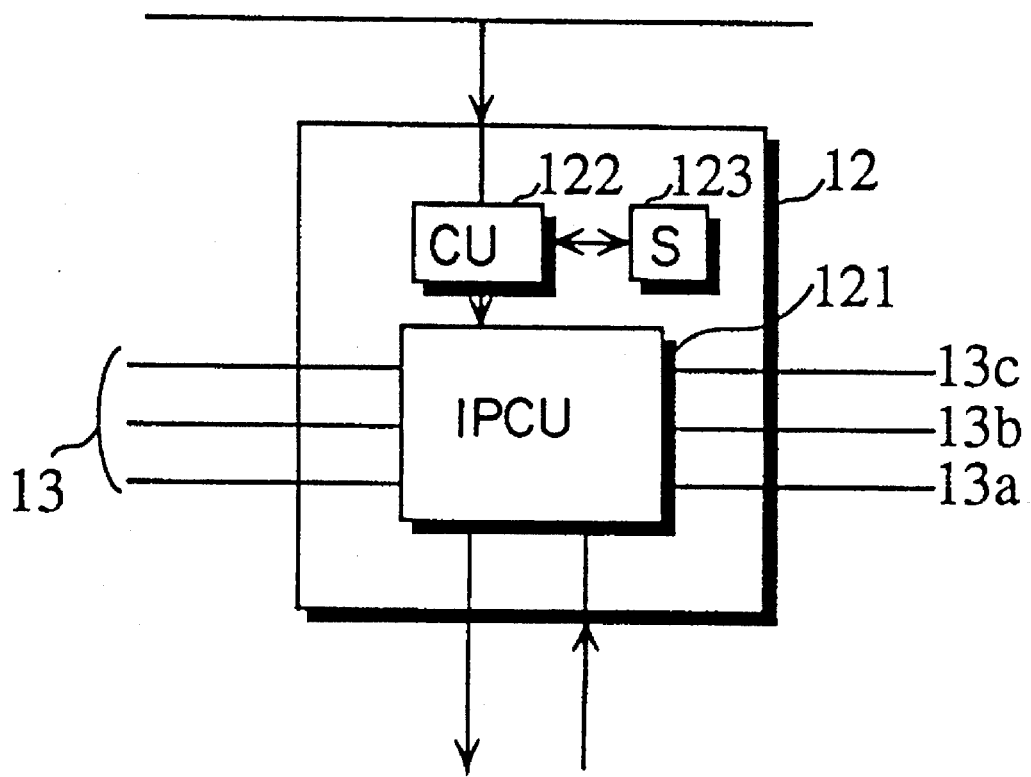
FIG. 5 shows the configuration of a configuration switch.

As shown in FIG. 5, the configuration switch 12 comprises an internal path connection unit 121, a connection pattern control unit 122, and a configuration switch information storage 123.

The configuration switch information storage 123 stores information indicating a current connection condition between its configuration switch (12a–12d) and a peripheral unit, a current connection pattern, and an internal path which will be newly linked when the current connection pattern is changed. As for connection conditions between a configuration switch and a peripheral unit, the followings will be disclosed. Whether the port 10 or the media access control unit 11 is associated with the configuration switch is described. When the port 10 is associated with the configuration switch, if the port 10 is connected to a ring network is described. Further, if the ring network connected to the port 10 is a ring branch network or a ring trunk network is described.

Responsive to a connection pattern change request from the traffic amount measuring unit 15, the connection pattern control unit 122 decides an ideal connection pattern in accordance with the internal path (name) which is in the over traffic state and information derived from the configuration switch information storage 123.

Figure 6:
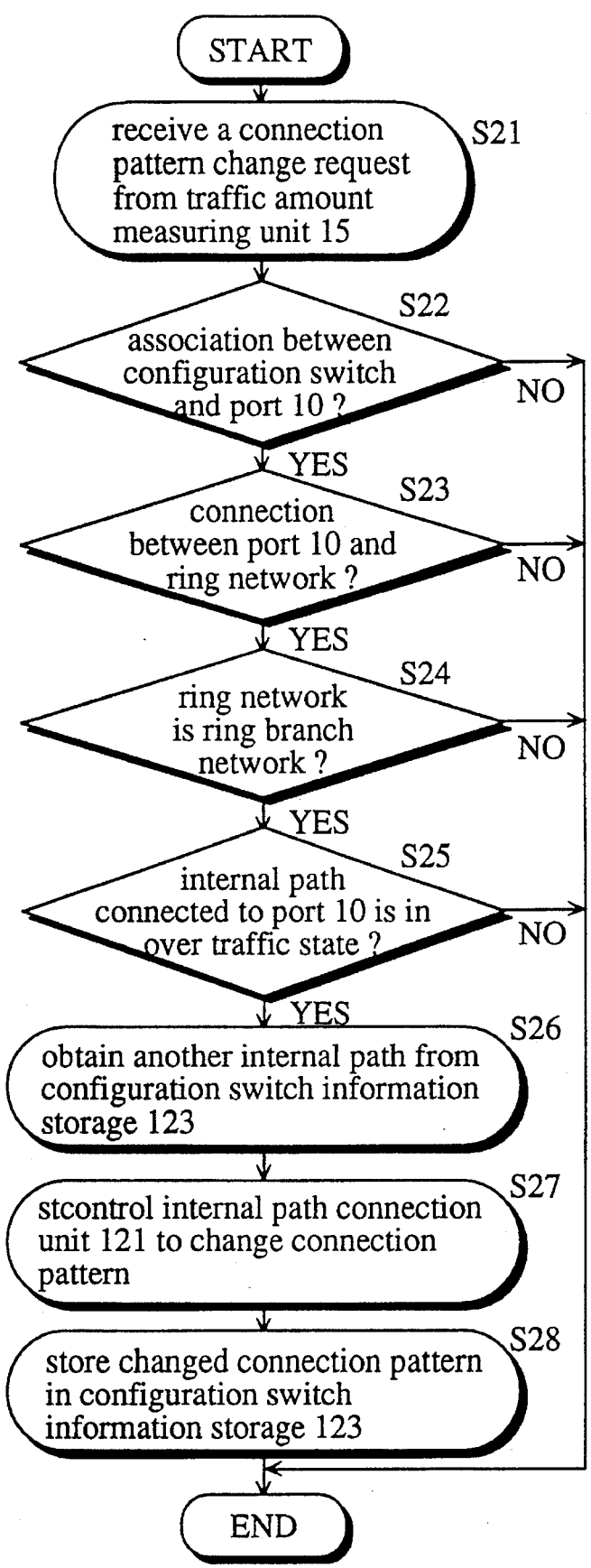
FIG. 6 is a flow chart showing a determination of a connection pattern at the configuration switch.

FIG. 6 shows a decision operation by the connection pattern control unit 122. When the connection pattern control unit 122 receives a connection pattern change request (S21) from the traffic amount measuring unit 15, it detects if its configuration switch 12 is associated with any port 10 (S22). When the configuration switch 12 is associated with the port 10, the connection pattern control unit 122 judges if the port 10 is connected to the ring branch network 3a, 3b (S23, S24). When the port 10 is connected to the ring branch network 3a, 3b, the connection pattern control unit 122 judges if the internal path 13a, 13b, or 13c connected to the ring branch network 3a, 3b is in the over traffic state (S25). If the internal path connected to the ring branch network 3a, 3b is in the over traffic state, the connection pattern control unit 122 obtains another internal path name from the configuration switch information storage 123 (S26), and controls the internal path connection unit 121 to change the connection pattern (S27). Subsequently, the changed connection pattern is stored in the configuration switch information storage 123 (S28).

Once the internal path connection unit 121 is controlled to change the connection pattern, the internal path connection unit 121 selects a connection pattern by which the port 10 is configured into the internal path obtained at S26, and establishes a communication channel thereby.

To be noted, connection patterns are changed only at the configuration switches 12c and 12d (S22–S24) in the flow chart of FIG. 6. If connection patterns were changed at the configuration switches 12a, 12b associated with the ports 10a, 10b respectively, the dual path design of the ring trunk network 2 would be changed since both the ports 10a and 10b are connected to it. For this reason, it is not desirable to change connection patterns at the configuration switches 12a, 12b. Also, if connection patterns were changed at the configuration switches 12e, 12f associated with the media access control unit 11a, 11b respectively, the design of the ring network system which includes the packet data relay unit 14 would be changed. For this reason, it is not desirable to change connection patterns at the configuration switch 12e, 12f. To the contrary, it is desirable to change connection patterns at the configuration switch 12e, 12f associated with the port 10a, 10b respectively, since by doing so, the terminal stations 4a, 4b connected to the ring trunk network which is in the over traffic state can be moved therefrom to another ring network. Consequently, a packet can be sent on a ring network which is not in the over traffic state.

Figure 7:
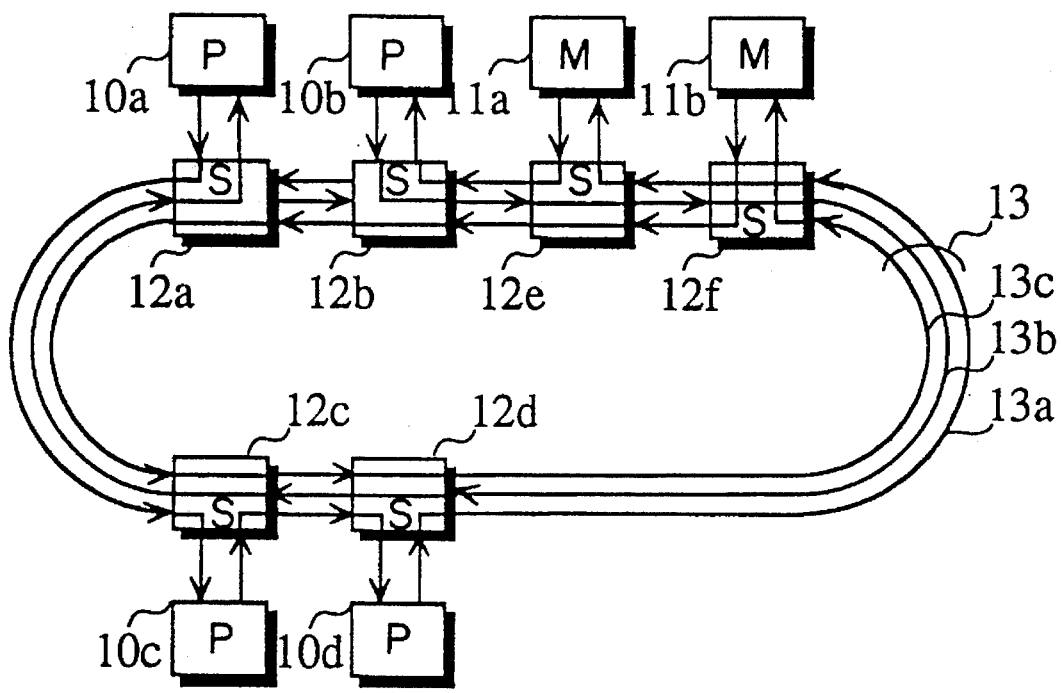
FIG. 7 shows a connection pattern which indicates the initial state of each configuration switch in the ring network concentrator.

A concrete example of the above operation will be described. FIG. 7 shows initial connection patterns at the configuration switches 12a–12f. According to the connection pattern at the configuration switch 12a, a packet from the port 10a is passed to the primary path 13a; a packet from the secondary path 13b is passed to the port 10a; and a packet travels around the local path 13c. According to the connection pattern at the configuration switch 12b, a packet from the port 10b is passed to the secondary path 13b; a packet from the primary path 13a is passed to the port 10b; and a packet travels around the local path 13c. According to the connection pattern at the configuration switch 12c, a packet from the port 10c is passed to the secondary path 13b; a packet from the primary path 13a is passed to the port 10c; and a packet travels around the local path 13c. According to the connection pattern at the configuration switch 12d, a packet from the port 10d is passed to the primary path 13a; a packet travels around the secondary path 13b; and a packet travels around the local path 13c. According to the connection pattern at the configuration switch 12e, a packet from the media access control unit 11a is passed to the primary path 13a; a packet from the primary path 13a is passed to the media access control unit 11a; a packet travels around the secondary path 13b; and a packet travels around the local path 13c. According to the connection pattern at the configuration switch 12f, a packet from the media access control unit 11b is passed to the local path 13c; a packet from the local path 13c is passed to the media access control unit 11b; a packet travels around the primary path 13a; and a packet travels around the secondary path 13b.

Figure 8:
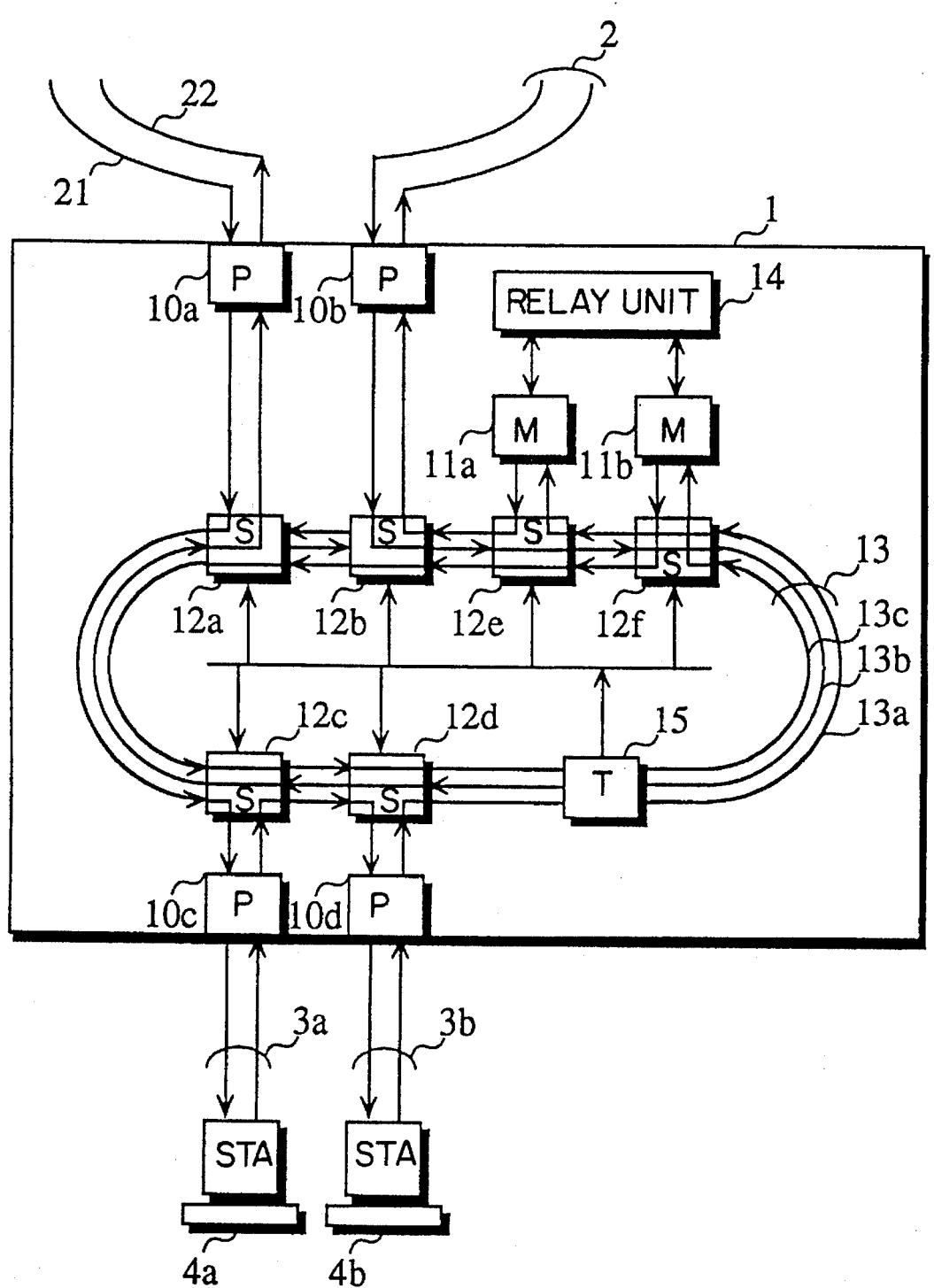
FIG. 8 shows the configuration of a ring network concentrator where the connection pattern of each configuration switch is set to be its initial state.

FIG. 8 shows the configuration of the ring network concentrator 1 which selects the connection patterns in FIG. 7 for the configuration switches 12a–12f.

Figure 9:
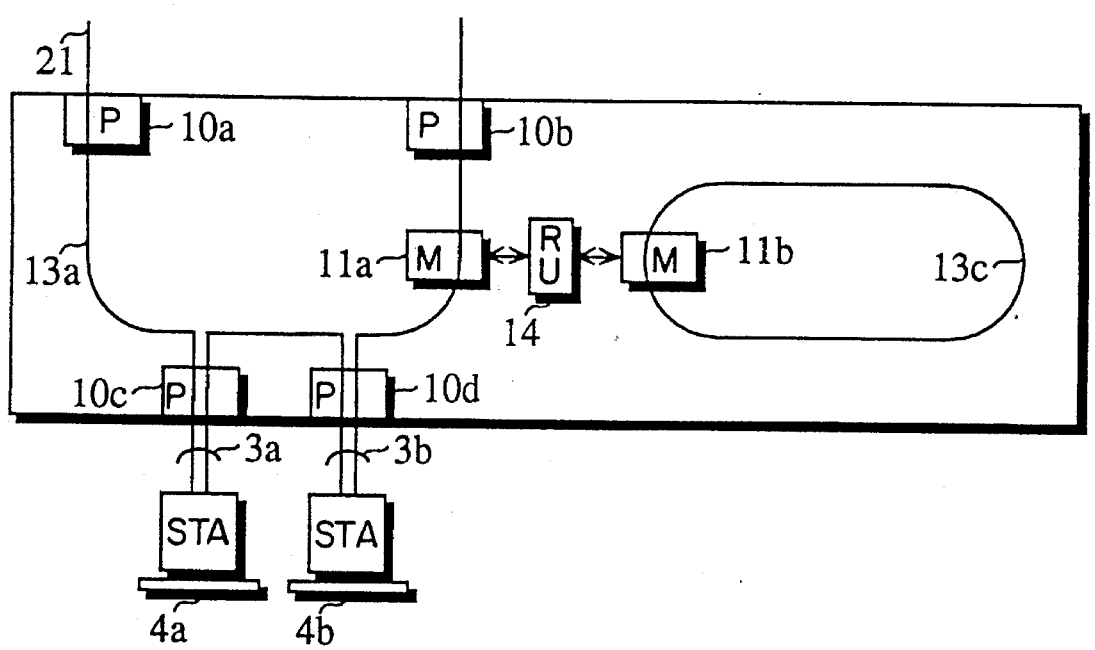
FIG. 9 shows the design of a ring network system built by the ring network concentrator of FIG. 8.

FIG. 9 shows the design of a ring network system built by the ring network concentrator of FIG. 8. In FIG. 9, the primary path 13a is connected to the main ring 21 of the ring trunk network 2 via the ports 10a, 10b, to the ring branch network 3a via the port 10c, and to the ring branch network 3b via the port 10d. Thus, one ring network is constructed from the main ring 21, the primary path 13a, and the ring branch network 3, whereby the terminal stations 4a and 4b are directly connected to the ring trunk network 2. The primary path 13a is connected to the media access control unit 11a; the local path 13c is connected to the media access control unit 11b; and the media access control unit 11a and the media access control unit 11b are connected via the packet data relay unit 14. Thus, the ring network system in FIG. 9 in constructed from the main ring 21; the packet data relay unit 14 connects the ring trunk network to which the terminal stations 4a, 4b are directly connected and a local ring network constructed from the local path 13c.

It is assumed herein that the main ring 21 is in the over traffic state. In this case, the internal path measuring unit 151 of the traffic amount measuring unit 15 in the ring network concentrator 1 measures the traffic amount of the primary-path 13a linked to the main ring 21, and notifies the measured traffic amount to the connection pattern judge unit 152. When the traffic amount from the internal path measuring unit 151 exceeds a predetermined threshold value, the connection pattern judge unit 152 judges that the primary path 3a is in the over traffic state, and requests of the configuration switch 12c to change the connection pattern. Responsive to the connection pattern change request from the traffic amount measuring unit 15, the connection pattern control unit 122 of the configuration switch 12c recognizes, according to the information from the configuration switch information storage 123, that the port 10c associated with the configuration switch 12c is configured into the ring branch network 3a, so that it allows to change the connection pattern. According to the connection pattern change request from the traffic amount measuring unit 15, the connection pattern control unit 122 recognizes that the primary path 13a is in the over traffic state. At the same time, according to the information from the configuration switch information storage 123, the connection pattern control unit 122 recognizes that the port 10c is connected to the internal path 13a. Subsequently, the connection pattern control unit 122 obtains from the configuration switch information storage 123 the information about an internal path to be newly linked, controls the internal path connection unit 121 to replace the current connection between the port 10c and the primary path with 13a a new connection between the port 10c and the local path 13c; and stores the new connection pattern into the configuration switch information storage 123. Controlled by the connection pattern control unit 122, the internal path connection unit 121 configures the port 10c into the local path 13c to establish a communication channel. Similarly, the configuration switch 12d configure the port 10d into the local path 13c.

At the configuration switches 12a, 12b, the connection pattern control unit 122 recognizes, according to the information from the configuration switch information control unit 123, that the ports 10a, 10b associated with the configuration switches 12a, 12b respectively, are connected to the ring trunk network 2. Because of the reason stated in the above, the connection pattern control unit 122 cancels the connection pattern change request. Similarly, at the configuration switches 12e, 12f, the connection pattern control unit 122 recognizes, according to the information from the configuration switch information storage 123, that the media access control units 11a, 11b are assigned with the configuration switches 12e, 12f respectively, so that it cancels the connection pattern change request from the traffic amount measuring unit 15.

Figure 10:
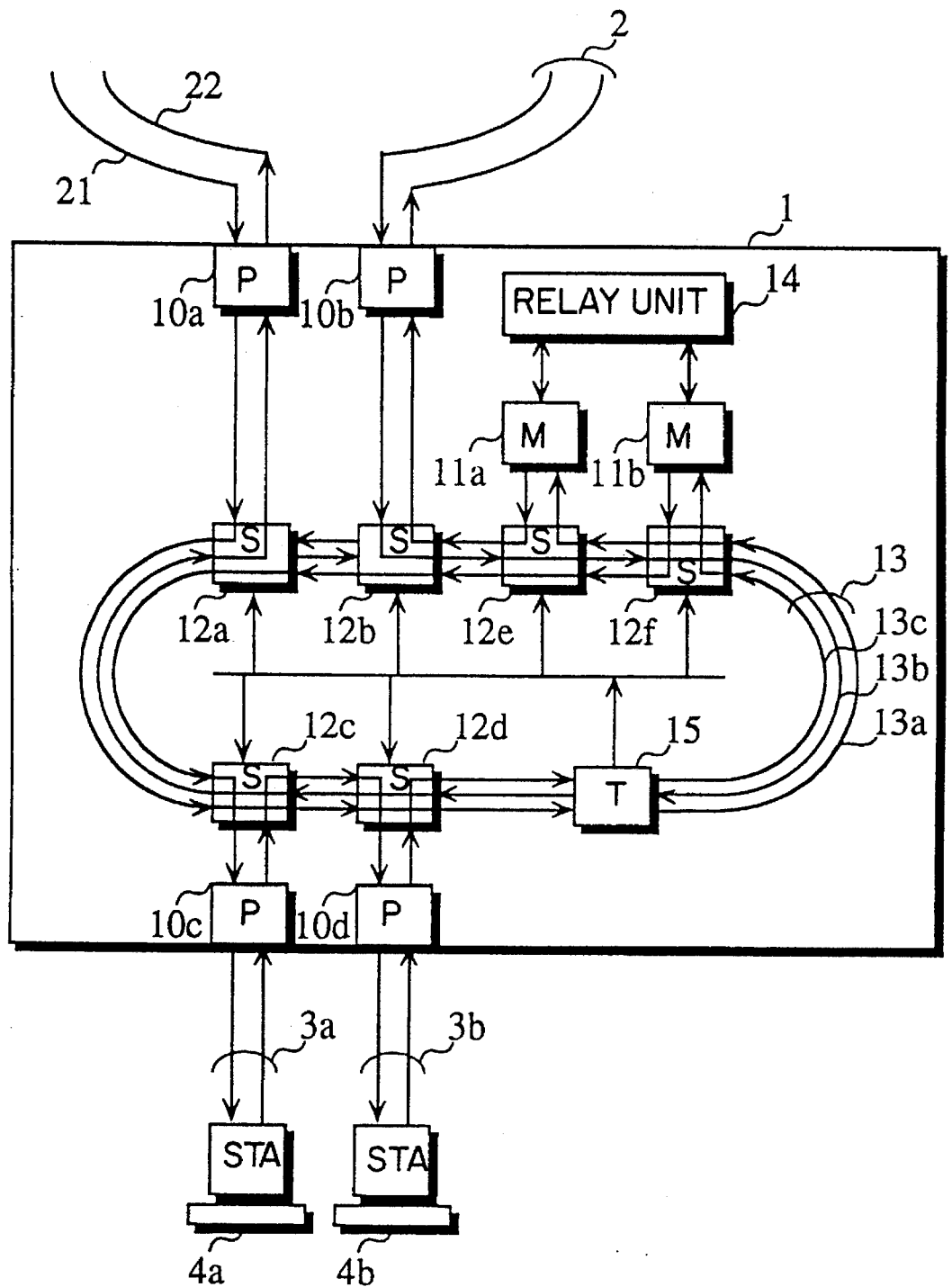
FIG. 10 shows the configuration of a ring network concentrator where the connection pattern of each configuration switch has been changed.

FIG. 10 shows the configuration of a ring network concentrator where the connection patterns at the configuration switches 12a, 12b have been changed.

Figure 11:
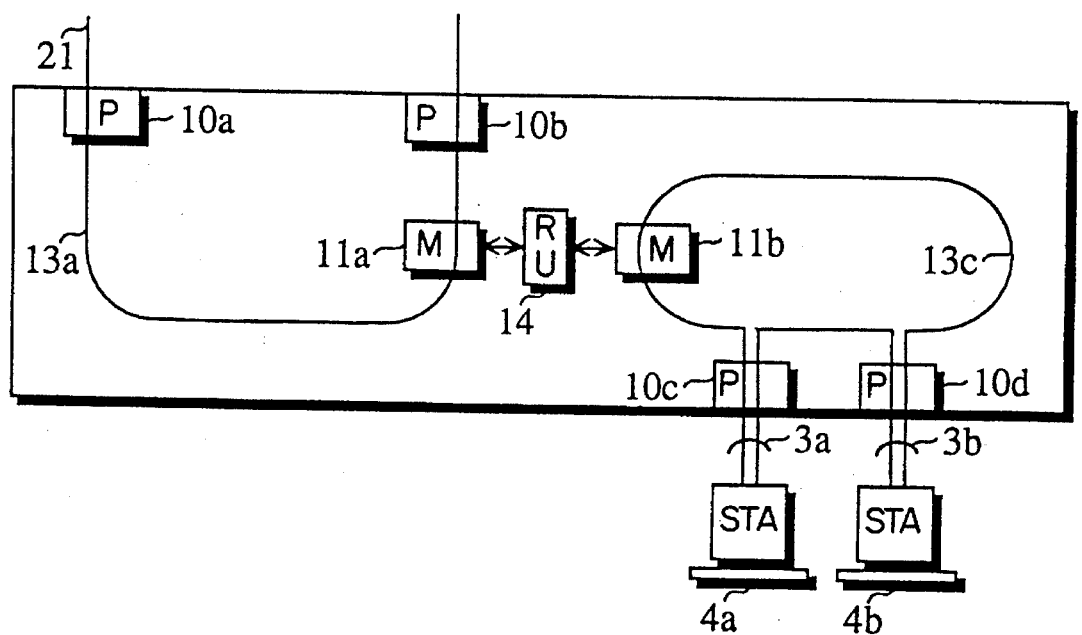
FIG. 11 shows the design of a ring network system built by the ring network concentrator of FIG. 10.
Figure 12:
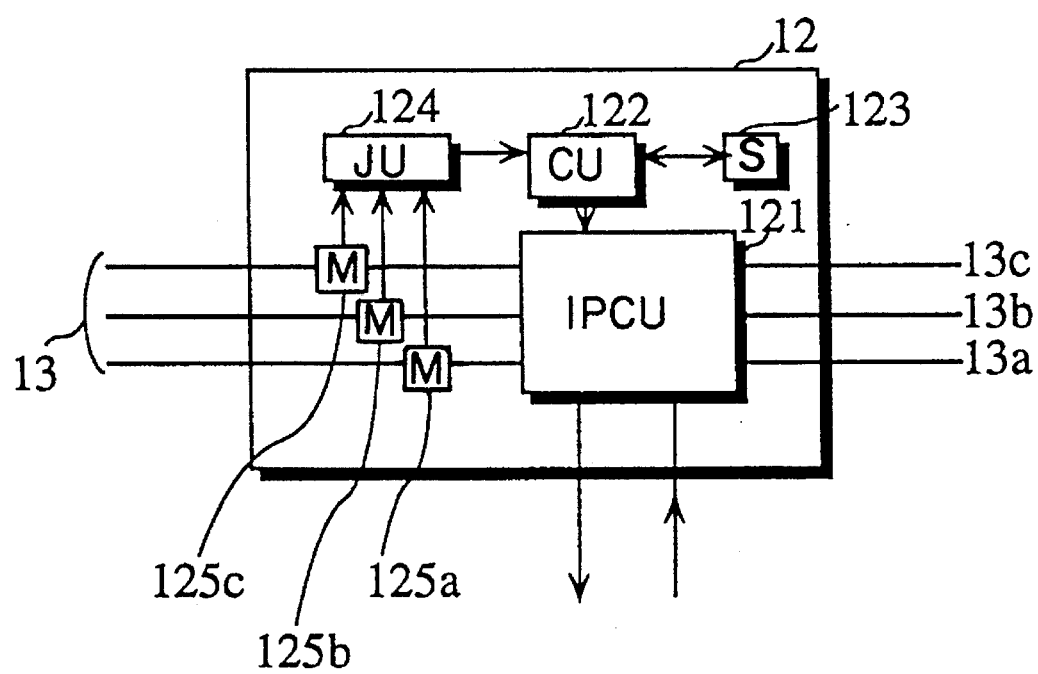
FIG. 12 shows the configuration of a configuration switch in a second embodiment of the present invention.

FIG. 11 shows the design of a ring network system built by the Ting network concentrator 1 of FIG. 10. The primary path 13a is configured into the main ring 21 of the rig branch network 2 via the ports 10a, 10b, and hence a ring network is constructed from the main ring 21 and the primary path 13a. The local path 13c is connected to the ring branch networks 3a, 3b via the ports 10c, 10d respectively, and hence a ring network is constructed from the local path 13c and the ring branch network 13c. Accordingly, the terminal stations 4a, 4b are directly connected to the local ring network constructed from the local path 13c. Also, the media access control unit 11a is attached to the primary path 13a; the media access control unit 11b is attached to the local path 13c; and the packet data relay unit 14 connects the media access control unit 11a and the media access control unit 11b. Thus, the ring network system is constructed from the ring trunk network made of the main ring 21 and the primary path 13a, and the local path 13c; and the packet data relay unit 14 connects the ring trunk network and the local ring network to which the terminal stations 4a, 4b are directly connected.

In the ring network system before the connection patterns are changed at the configuration switches 12c, 12d, the terminal stations 4a, 4b are directly connected to the main ring 21 of the ring trunk network which is in the over traffic state, so that a packet reception/transmission fails at a high possibility. Moreover, a re-transmission of the packet by the terminal stations 4a, 4b further increases the traffics of the ring branch network.

Figure 15:
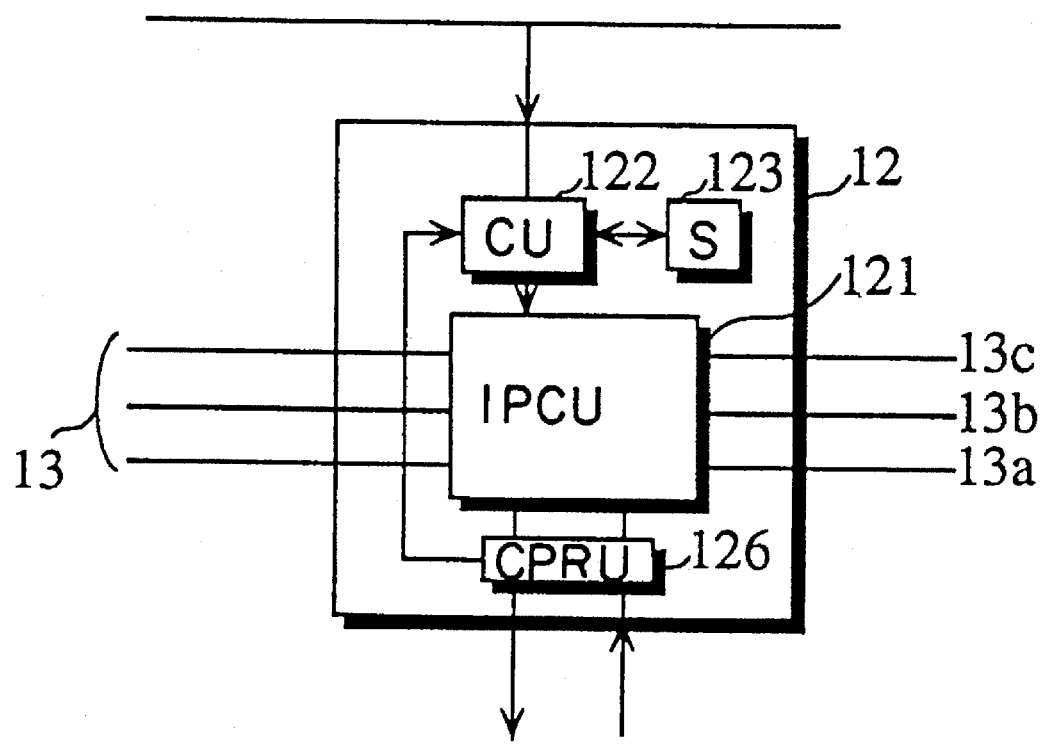
FIG. 15 shows the configuration of a configuration switch in the ring network concentrator.

In the ring network system after the connection patterns are changed at the configuration switches 12c, 12d, on the other hand, the terminal stations 4a, 4b which had been connected to the main ring 21 before are connected to the local ring network made of the local path 13c since the main ring 21 is in the over traffic state. As a result, packet transmissions/receptions with the terminal stations 4a, 4b are not annoyed by the over traffic state of the ring trunk network, and the terminal stations connected to the ring trunk network are partitioned into a plurality of ring networks. Further, the traffics of the ring trunk network can be suppressed. Additionally, the traffic amount measuring unit 15 is provided independently from the configuration switches 12a–12f in the above; however, the functions of the traffic amount measuring unit 15 can be added to the configuration switches 12a–12f. FIG. 15 shows the configuration of the configuration switch where the traffic amount measuring unit 15 is omitted.

Each configuration switch 12 comprises the internal path connection unit 121, the connection pattern control unit 122, the configuration switch information storage 123, the connection pattern judge unit 124, and the internal path measuring unit (125a, 125b, 125c). The internal path connection unit 121, the connection pattern control unit 122, and the configuration switch information storage 123 are substantially same those in the above. Also, although the internal path 13 includes only one local path 13c in the figures, a plurality of local paths can be prepared. In this case, connection patterns at the configuration switches 12c, 12d can be selected so as to configure the ports 10a, 10b currently configured into the ring branch networks 3a, 3b into desired local paths.

Although only two terminal stations 4a, 4b are provided in the above, the number of terminal stations is not limited. If an enormous number of terminal stations, such as 1000 or 10,000, are provided, they may be partitioned into plurality of ring networks instead of connecting all stations to a single network system.

[Embodiment 2]

Another embodiment will be described. In the first embodiment, to measure the traffic amount, all the packets sent on an internal path are counted regardless of what their contents are. Then, if the measured traffic amount is high, the connection pattern is changed. When a number of packets are sent on an internal path and those packets include a plurality of packet types, however, delivery of some packets can be delayed to some extent, but delivery of other packets cannot be delayed since they include information which become valueless if they are delivered late. For this reason, it is beneficial to change a connection pattern at a configuration switch in accordance with a packet type. Hereunder, the configuration and operation which achieve this will be discussed.

Figure 13:
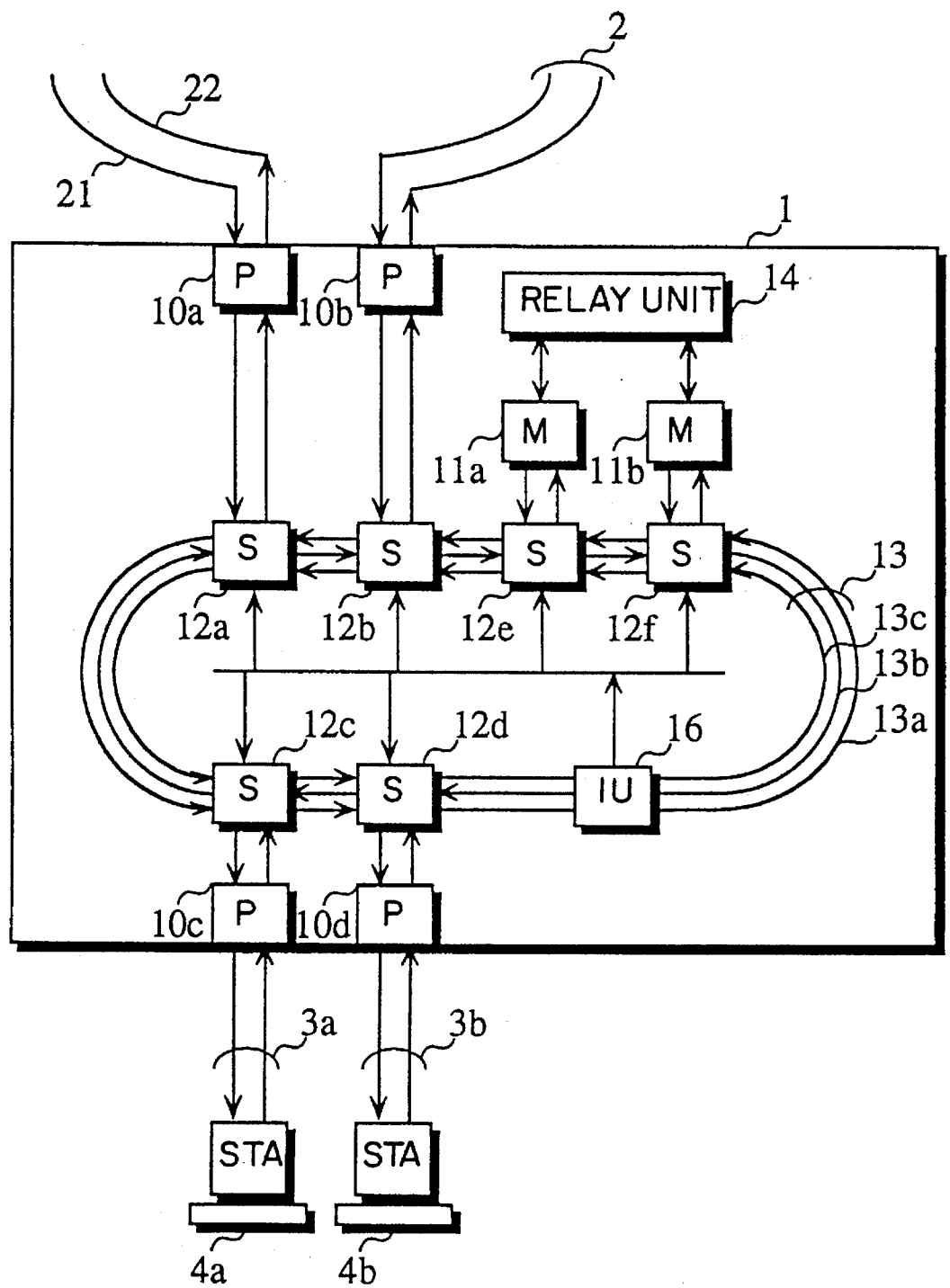
FIG. 13 shows the configuration of a ring network concentrator in a third embodiment of the present invention.

As shown in FIG. 13, the second embodiment is the same as the first embodiment except that a communication protocol identification unit 16 is installed instead of the traffic amount measuring unit, and each configuration switch is capable of judging what sort of communication protocol is included in a packet sent from a terminal station 4a or 4b.

Figure 14:
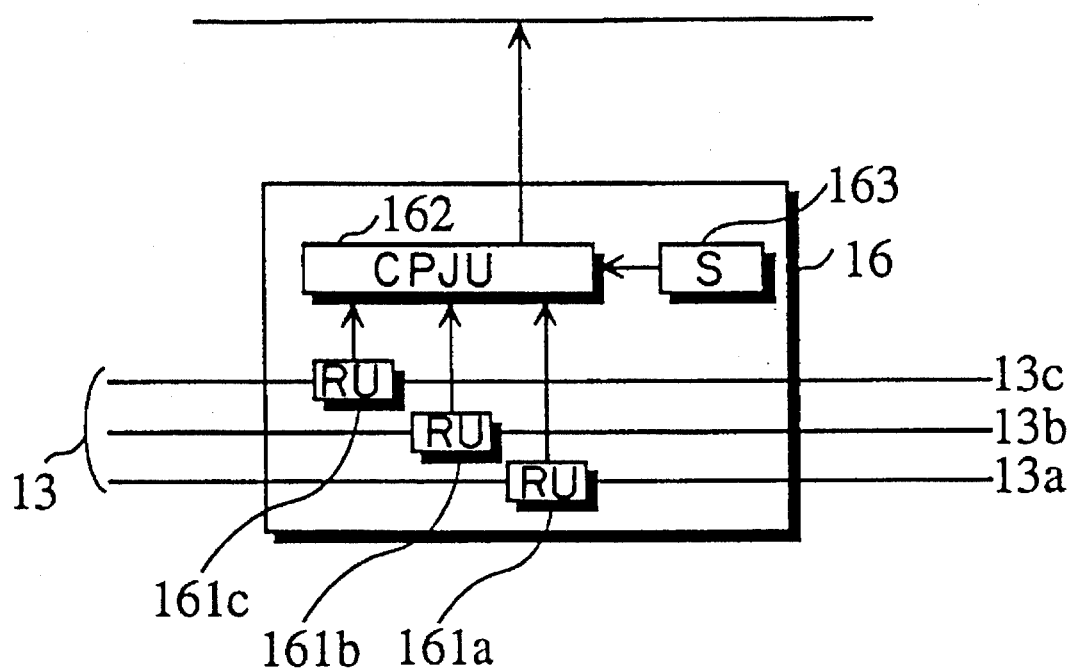
FIG. 14 shows the configuration of a communication protocol identification unit in the ring network concentrator.

The communication protocol identification unit 16 identifies a communication protocol included in a packet to be sent on an internal path, and requests of a configuration switch 12 to change the connection pattern according to the identified communication protocol. FIG. 14 shows the detailed configuration of the communication protocol identification unit. As shown in FIG. 14, the communication protocol identification unit 16 comprises a communication protocol recognition unit 161 (161a, 161b, 161c), a connection pattern judge unit 162, and a communication protocol information storage 163.

The communication protocol recognition unit 161 recognizes a communication protocol of a packet to be sent on an internal path 13, and notifies the connection pattern judge unit 162 of the recognized communication protocol. Communication protocol include TCP/IP, OSI which are well-known protocols, or any communication means which distinguish packets. To recognize a communication protocol of a packet, a header of the packet is read. Take, for instance, a header of a FDDI packet type includes a type (Type) besides a destination address (DA), and a source address (SA), and Type corresponds to a communication protocol of the packet. Therefore, to recognize a communication protocol of a packet, the communication protocol recognition unit 161a reads Type and searches in a correspondence table for a communication protocol corresponding to the Type.

The communication protocol recognition unit 161a for reading Type comprises a counter for counting how many bits are placed between the beginning of a header and the beginning of Type information, a counter for counting how many bits are placed between the beginning of a header and the end of Type information, a shift register for storing the bits read since the former counter finishes its counting until the second counter finishes its counting, and a decoder for decoding the bits stored in the shift register. The communication protocol recognition units 161a, 161b, 161c recognizes a communication protocol of a packet to be sent on a primary path 13a, a secondary path 13b, and a local path 13c respectively.

When the communication protocol recognized by the communication protocol recognition unit 161 coincides the communication protocol in the communication protocol information storage 163 which demands a change in the connection pattern at the configuration switch 12, the connection pattern judge unit 162 requests of the configuration switch 12 to change its connection pattern according to the internal path (13a, 13b, 13c) to be newly linked.

The communication protocol information storage 163 stores communication protocols that demand to change connection patterns at configuration switches and information about the internal path to be newly linked. For example, a high-speed data communication protocol may demand to change a connection pattern.

As shown in FIG. 15, each configuration switch 12 comprises an internal path connection unit 121, a connection pattern control unit 122, a configuration switch information storage 123, and a terminal station communication protocol recognition unit 126.

The internal path connection unit 121 is controlled by the connection pattern control unit 122 to select a connection pattern between the internal path 13, a port 10, and a media access control unit 11, and hence a communication channel is established.

The connection pattern control unit 122 controls a connection pattern at the internal path connection unit 121 according to the information from the configuration switch information storage 123 and the terminal station communication protocol recognition unit 126, and a connection pattern change request from the communication protocol recognition unit 16.

The configuration switch information storage 123 stores a connection pattern at the internal path connection unit 121, and information about the port 10 or the media access control unit 11 associated with the configuration switch 12.

The terminal station communication protocol recognition unit 126 recognizes a communication protocol of a packet sent from a terminal station onto the ring network to which the port 10 associated with the configuration switch 12 is connected, and notifies the connection pattern control unit 122 of the recognized communication protocol.

Figure 16:
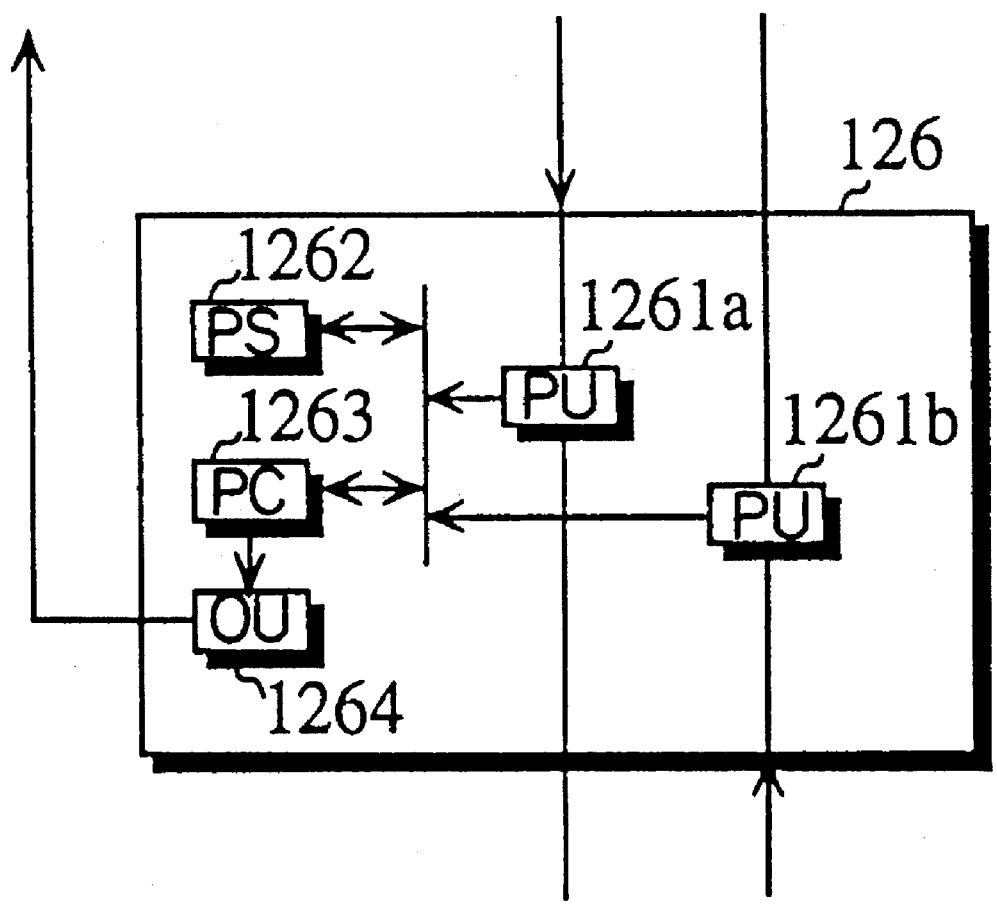
FIG. 16 shows the configuration of a terminal station communication protocol recognition unit of the configuration switch.

As shown in FIG. 16, the terminal station communication protocol recognition unit 126 comprises an upstream packet obtaining unit 1261a, a downstream packet obtaining unit 1261b, a packet storage 1262, a packet comparing unit 1263, and a communication protocol obtaining unit 1264.

The upstream packet obtaining unit 1261a makes a copy of a packet sent from upstream of the ring network, and stores the copy with a time stamp into the packet storage 1262. The downstream packet obtaining unit 1261b makes a copy of a packet sent from downstream of the ring network, and stores the copy with a time stamp into the packet storage 1262. To make a copy of a packet, the upstream packet obtaining unit 1261a and the downstream packet obtaining unit 1261b produce a copy of all the bits from the beginning to the end of the original packet. This copying can be carried out by a well-known circuit, such as the circuit which combines a shift register and a latch circuit.

The packet storage 1262 stores a copy of a packet made by the upstream packet obtaining unit 1261a and a copy of a packet made by the downstream packet obtaining unit 1261b, together with their time stamps.

The packet comparing unit 1263 examines the packets in the packet storage 1262, and if the same packet was obtained by the upstream packet obtaining unit 1261a and the downstream packet obtaining unit 1261b, it compares its time stamps. If the time stamp from the downstream packet obtaining unit 1261a is earlier than the time stamp from the upstream packet obtaining unit 1261b, the packet comparing unit 1263 judges that the packet is from a terminal station connected to a ring network constructed from an upstream line and a downstream line, then notifies the communication protocol obtaining unit 1264 of this packet.

The communication protocol obtaining unit 1264 obtains a communication protocol of the packet notified by the packet comparing unit 1263, and informs the connection pattern control unit 122 of the configuration switch 12 of the obtained communication protocol.

When receiving a communication protocol of a packet sent from a terminal station on the ring network between the upstream line and the downstream line from the communication protocol obtaining unit 1264, and receiving a connection pattern change request from the communication protocol recognition unit 16, the communication pattern control unit 122 changes the connection pattern if the communication protocol included in the connection pattern change request coincides with the communication protocol from the communication protocol obtaining unit 1264.

Figure 17:
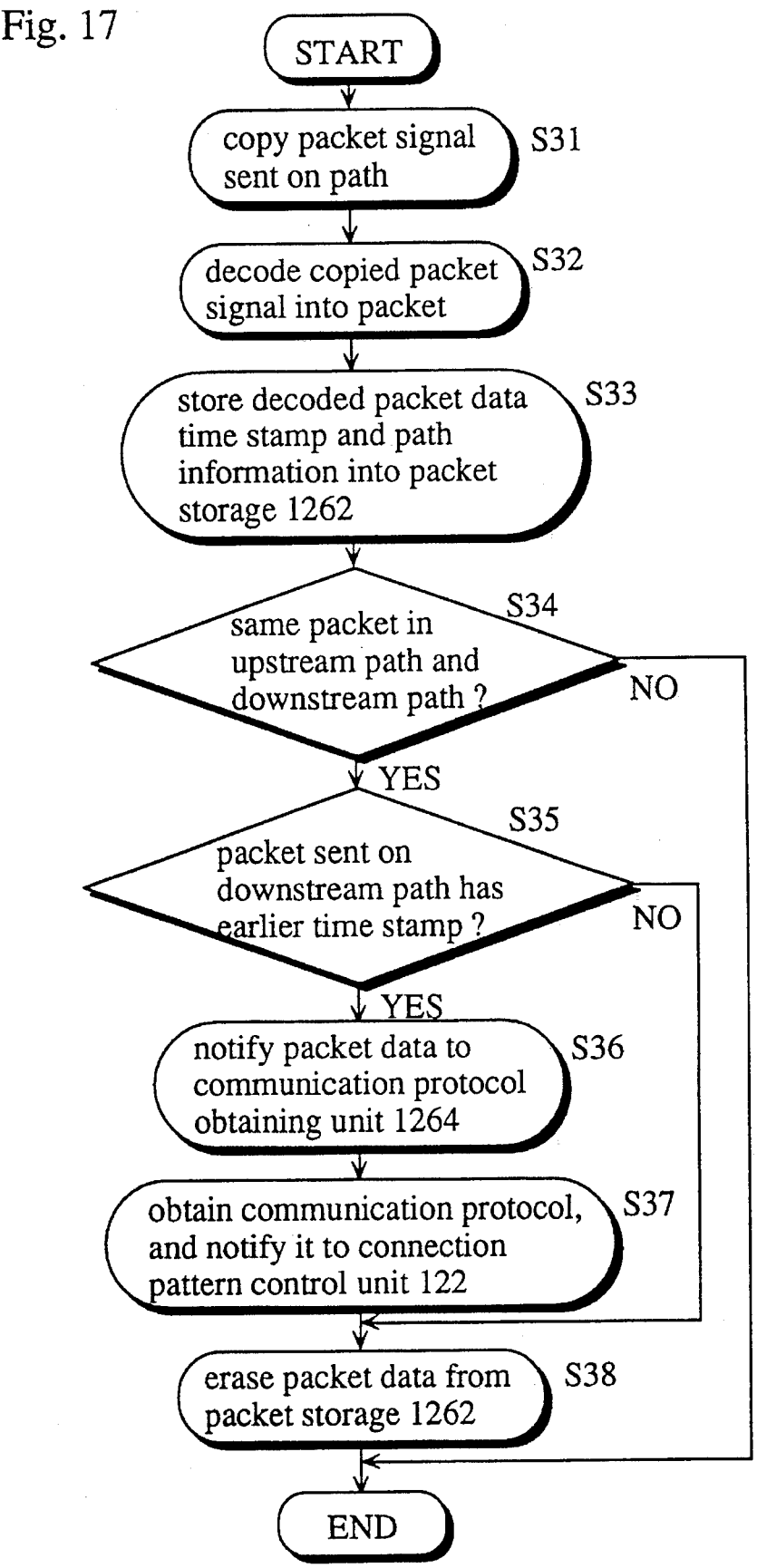
FIG. 17 is a flow chart showing a recognition of a communication protocol of the packet when a packet is sent from a terminal station onto a ring network connected to a configuration switch via a port.

FIG. 17 is a flow chart showing a recognition of a communication protocol of a packet sent from a terminal station connected to a ring network attached to downstream.

At S31, the upstream packet obtaining unit 1261a and the downstream packet obtaining unit 1261 make a copy of packet signals sent on the paths to which they are connected.

At S32, the upstream packet obtaining unit 1261a and the downstream packet obtaining unit 1261b decode the packet signals into packets.

Subsequently, the upstream packet obtaining unit 1261a and the downstream packet obtaining unit 1261b store the decoded packet data together with their time stamps into the packet storage 1262 (S33).

The packet comparing unit 1263 examines the packet data in the packet storage 1262 to judge if the same packet is sent from the upstream packet obtaining unit 1261a and the downstream packet obtaining unit 1261b (S34).

If the same packet is sent, the packet comparing unit 1263 compares the time stamps, and when the time stamp obtained by the downstream packet obtaining unit 1261a is earlier than the time stamp obtained by the upstream packet obtaining unit 1261b (S35), it judges that the terminal station which sent the packet is placed on downstream of the ring network, and sends the packet data to the communication protocol obtaining unit 1264 (S36).

The communication protocol obtaining unit 1264 analyzes the packet data to obtain its communication protocol, and notifies the connection pattern control unit 122 of the configuration switch 12 of the obtained communication protocol (S37).

The packet comparing unit 1263 erases the packet data from the packet storage 1262 (S38).

Figure 18:
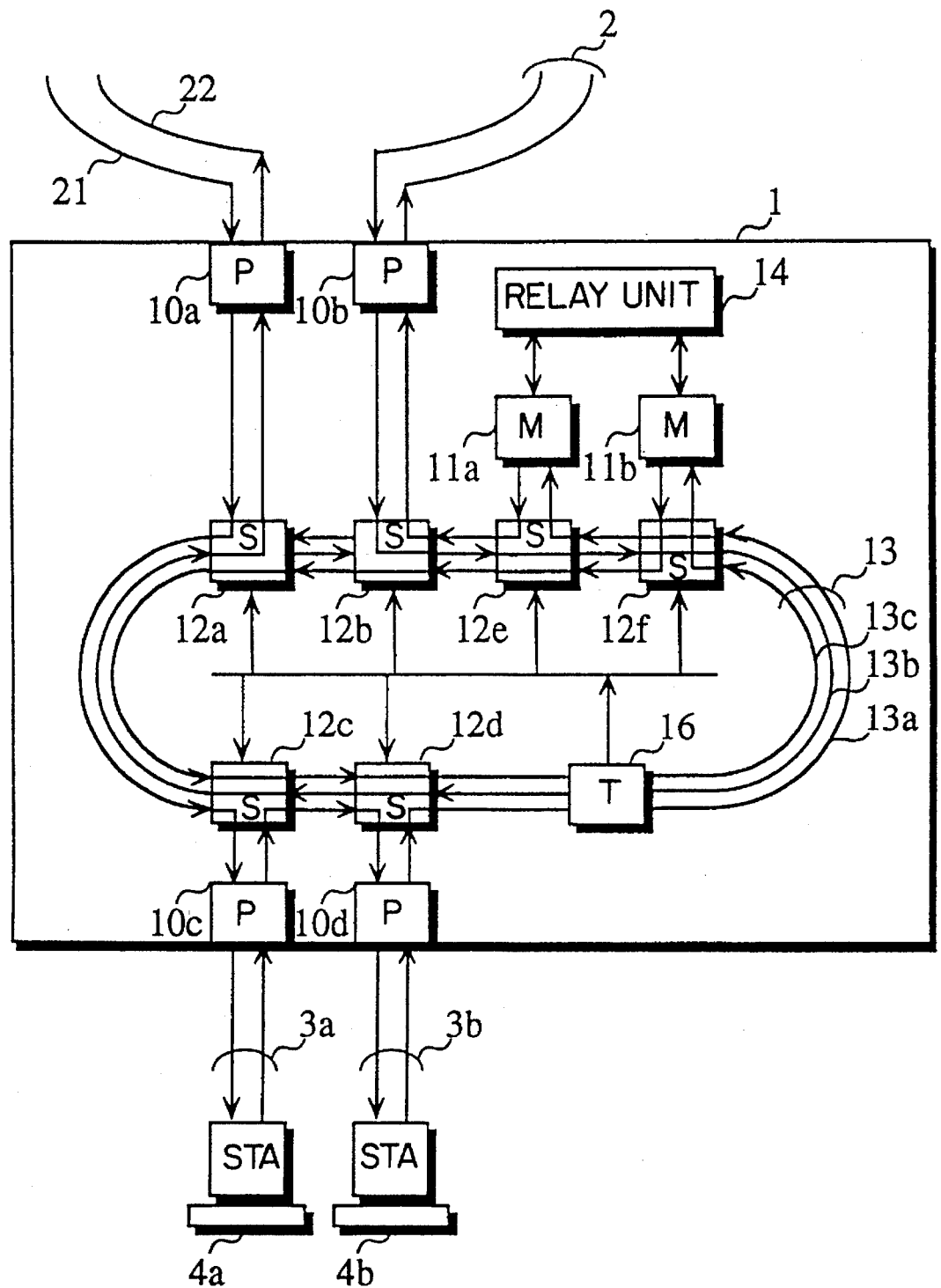
FIG. 18 shows the configuration of a ring network concentrator where the connection pattern of each configuration switch is set to be its initial state.
Figure 19:
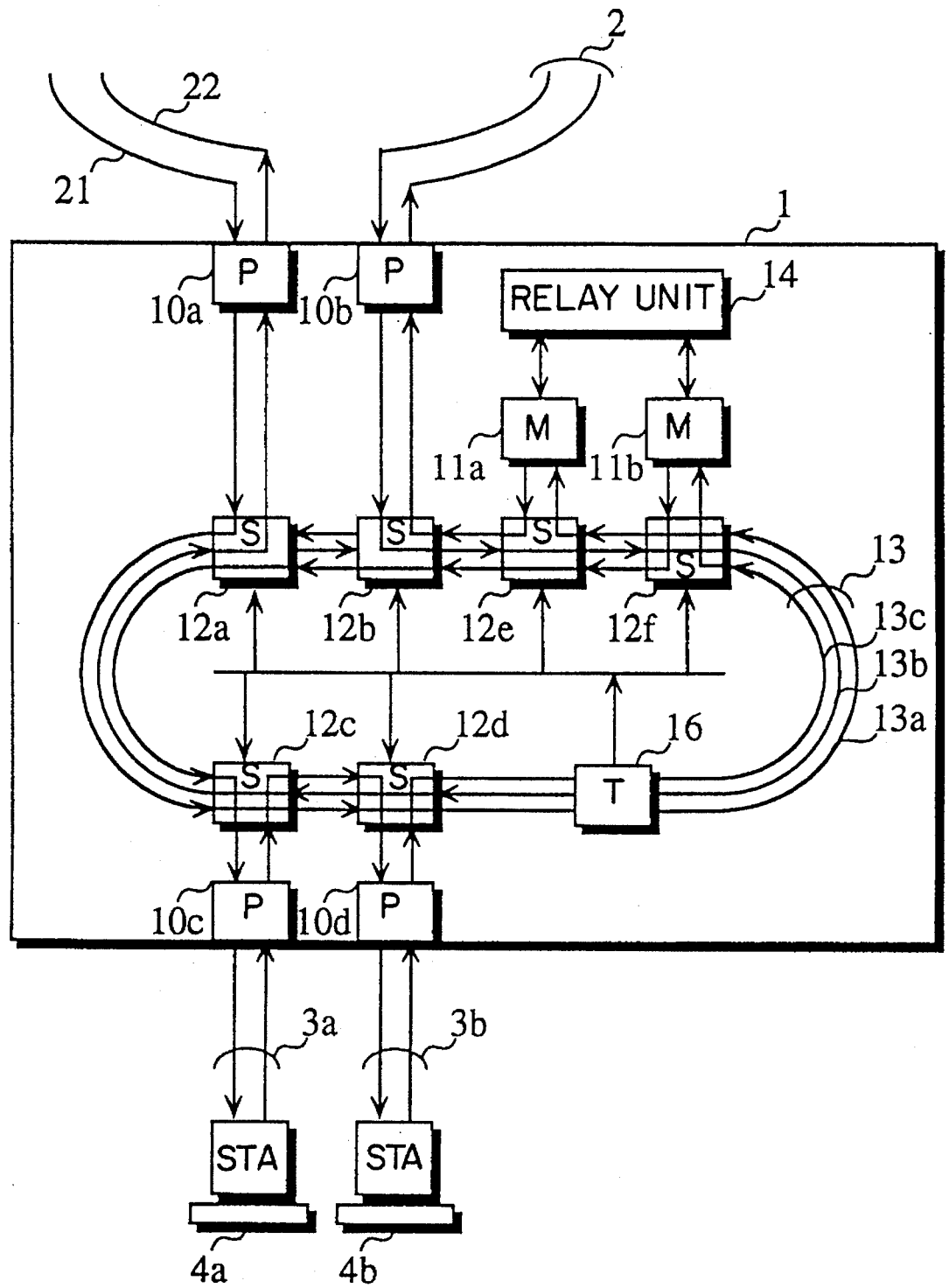
FIG. 19 shows the configuration of a ring network concentrator where the connection pattern of each configuration switch has been changed.

The operation of the ring network concentrator 1 is described as referring to FIGS. 18 and 19. FIG. 18 shows initial connection patterns at configuration switches. With the connection patterns in FIG. 18, terminal stations 4a, 4b carry out a data transmission/reception according to a high-speed data communication protocol, such as a transmission/reception of image data or voice data. The terminal stations 4a, 4b transmit/receive packets via a ring network constructed from a main ring 21 of a ring trunk network 2, an internal path 13a, and ring branch networks 3a, 3b.

The ring network concentrator 1 comprises a communication protocol identification unit 16, and the communication protocol recognition unit 161a of the communication protocol identification unit 16 recognizes a communication protocol of a packet sent on the primary path 13a, then notifies the connection pattern judge unit 162 of the recognized communication protocol.

According to the communication protocol notified by the communication protocol recognition unit 161a, the communication pattern judge unit 162 recognizes that the packet possessing a high-speed data communication protocol is sent on the primary path 13a.

Subsequently, as referring to the information from the communication protocol information storage 163, the connection pattern judge unit 162 decides to send the packet on a local path 13c instead of the primary path 13a, then requests of the configuration switch 12 to change the connection pattern.

Responsive to the connection pattern change request from the communication protocol recognition unit 165, the connection pattern control unit 122 of a configuration switch 12c recognizes, according to the information from the configuration switch information storage 123, that a port 10c associated with the configuration switch 12c is connected to the ring branch network 3a. Also, the connection pattern control unit 122 is informed by the terminal station communication protocol recognition unit 126 that the packet including the high-speed data communication protocol is sent from a terminal station connected with the ring branch network 3a. Accordingly, the connection pattern control unit 122 starts to change the connection pattern. According to the connection pattern change request from the communication protocol identification unit 16, the connection pattern control unit 122 recognizes that the packet including the high-speed data communication protocol is sent on the primary path 13a, at the same time it recognizes from the information in the configuration switch information storage 123 that the port 13c which receives the packet including the high-speed data communication protocol is configured into the internal path 13a. Then, the connection pattern control unit 122 recognizes the internal path to be newly linked according to the connection pattern change request derived from the communication protocol identification unit 16, and controls the internal path connection unit 121 to replace the current connection between the port 10c and the primary path 13a with a new connection between the port 13c and the local path 13c, and stores the new connection into the configuration switch information storage 123.

Controlled by the connection pattern control unit 122, the internal path connection unit 121 configure the port 10c into the local path 13c to establish a communication channel. Similarly, a configuration switch 12d configure a port 10d into the local path 13c. Because of the reasons stated in the first embodiment, connection patterns at the configuration switch 12a, 12b, 12e, and 12f will not be changed. FIG. 19 shows the configuration of the ring network concentrator 1 where the connection patterns have been changed. FIG. 11 shows the design of a ring network system built by the ring network concentrator 1 of FIG. 19.

In the ring network system before the connection patterns at the configuration switches 12c, 12d are changed, the terminal stations 4a and 4b are directly connected to the ring trunk network constructed from the main ring 21 and the internal path 13a. A packet including a high-speed data communication protocol is sent to the terminal stations 4a, 4b on the thus constructed ring trunk network.

It is assumed herein that a number of terminal stations are connected to the ring trunk network independently, and these terminals stations start a data communication. Although the traffics of the ring trunk network is increased, the amount of data which can be sent on the ring trunk network is limited. Therefore, a packet transmission/reception by the terminals stations 4a, 4b may not be successful, whereby a high-speed data communication may result in a failure.

In the ring network system after the connection patterns are changed at the configuration switches 12c, 12d, however, the terminal stations 4a, 4b which had been connected to the ring trunk network constructed from the main ring 21 and the internal path 13c, are connected to the local ring network. Thereby, the traffics which had been loaded on the ring trunk network is partitioned, and a high-speed data communication can be carried out by the terminal stations 4a and 4b until a maximum data amount which can be sent on the local ring network is reached. Further, different ring networks are employed depending on communication protocols, so that basically same as the allocation according to a synchronous bandwidth, a data communication according to a high-speed data communication protocol is not annoyed by terminal stations which carry out other communication protocols. As a result, reliability of data communications is improved.

In the above, the communication protocol recognition unit 16 and the configuration switch 12 are constructed separately; however, each configuration switch 12 may implement the functions of the communication protocol recognition unit 16.

Figure 20:
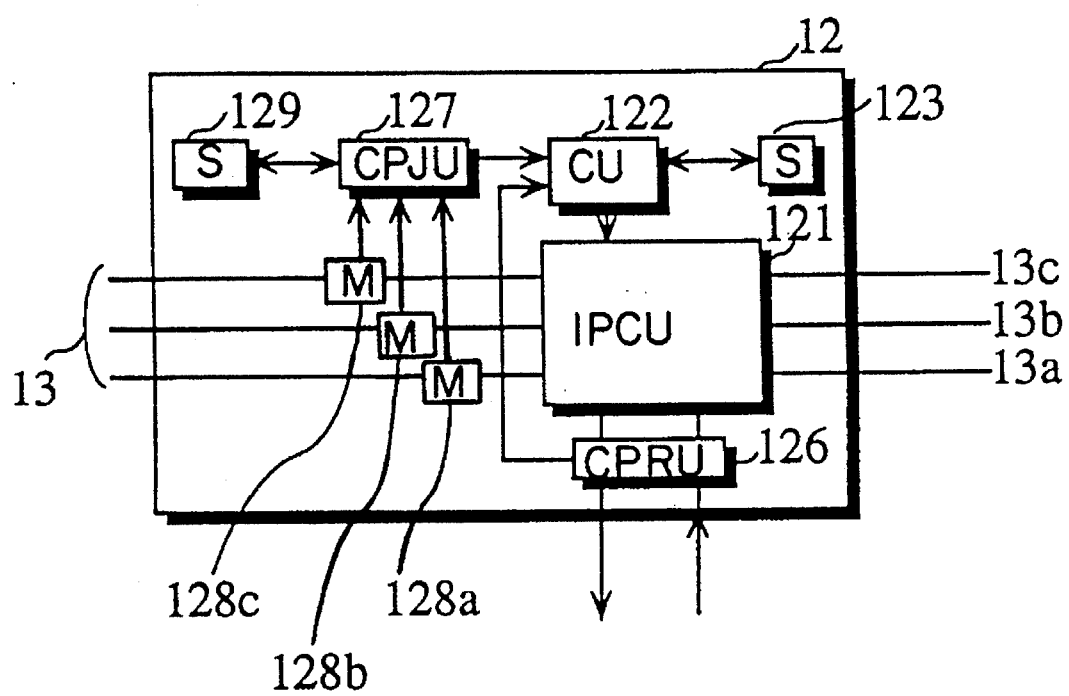
FIG. 20 shows the configuration of a configuration switch in a fourth embodiment of the present invention.

FIG. 20 shows the construction of a configuration switch which implements the functions of the communication protocol recognition unit 12. As shown in FIG. 20, a configuration switch 20 includes an internal path connection unit 121, a connection pattern control unit 122, a configuration switch information storage 123, a terminal station communication protocol recognition unit 126, a communication protocol judge unit 127, a communication protocol recognition unit 128 (128a, 128b, 128c), and a communication protocol information storage 129.

Controlled by the connection pattern control unit 122, the internal path connection unit 121 decides a connection pattern between an internal path 13, a port 10, and a media access control unit 11 to establish a communication channel.

The connection pattern control unit 122 controls the connection pattern at the internal path connection unit 121 according to information from the configuration switch information storage 123 and the terminal station communication protocol recognition unit 126, and a connection pattern change request from the communication protocol judge unit 127.

The configuration switch information storage 123 stores the connection pattern decided by the internal path connection unit 121, information about the port 10 or the media access control unit 11 associated with the configuration switch 12.

The terminal station communication protocol recognition unit 126 recognizes a communication protocol of a packet from a terminal station on the ring network to which the port 10 associated with the configuration switch 12 is connected, and notifies the communication pattern control unit 122 of the recognized communication protocol. Thus, the terminal station communication protocol recognition unit 126 functions the same as described in the above.

When the communication protocol notified by the communication protocol recognition unit 128 (128a, 128b, 128c) coincides the communication protocol from the communication protocol information storage 129 which demands a change in the connection pattern at the configuration switch, the communication protocol judge unit 127 notifies the connection pattern control unit 122 of the communication protocol and the internal path (13a, 13b, or 13c) to be newly linked.

The communication protocol recognition unit 128 recognizes a communication protocol of a packet to be sent on the internal path 13, and notifies the communication protocol judge unit 127 of the recognized communication protocol. The communication protocol recognition units 128a, 128b, 128c recognize a packet to be sent on the primary path 13a, secondary path 13b, and local path 13c respectively.

The communication protocol information storage 129 stores a communication protocol that demands a change in the connection pattern at the configuration switch 12, and information about the internal path to be newly linked.

Although a predetermined number of ports, media access control units, configuration switches, and internal passes are employed in the above embodiments, the number of those components can vary. When a larger number of those components are employed, a ring network can be built more flexibly.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A ring network concentrator to which a plurality of ring networks are connected so as to form a network system of the ring networks, the ring network concentrator comprising:

a plurality of internal paths for transferring packets within the ring network concentrator;

a plurality of ports, disposed in connecting lines between the ring networks and the internal paths, for receiving packets from the ring networks and transmitting packets to the ring networks;

a transfer packet monitoring means for monitoring each packet transferred via each internal path;

a plurality of switch means, each for changing its connection pattern between the ring networks and the internal paths depending on the monitoring result of the transfer packet monitoring means, wherein a connection pattern for a switch describes which internal paths are connected to which ports, so that each connection pattern determines to which internal path a packet sent from one of the ring networks is sent.

2. The ring network concentrator of claim 1, wherein the transfer packet monitoring means is a traffic amount measuring means for measuring a traffic amount of how many packets are transferred per unit time on each internal path.

3. The ring network concentrator of claim 2, wherein the ring networks comprise a ring trunk network and a ring branch network.

4. The ring network concentrator of claim 3, wherein the ring trunk network comprises dual rings; and the internal paths comprise a main path connected to one of the dual rings, a sub path connected to the other of the dual rings, and at least one spare path.

5. The ring network concentrator of claim 4, wherein the traffic amount measuring means comprises a path traffic amount measuring unit for measuring a traffic amount on each internal path, a comparing unit for comparing the measured traffic amount from the path traffic amount measuring unit with a threshold value, and a change request output unit for outputting a change request which requests the plurality of switch means to change their connection patterns when the measured traffic amount exceeds the threshold value.

6. The ring network concentrator of claim 5, wherein each of the plurality of switch means comprises:

an environmental information storage for storing current environmental information about the switch means to which it belongs;

a connection pattern change forbidding unit for forbidding the switch means to which it belongs to change its connection pattern unless it is associated with the port connected to the ring branch network; and a connection pattern change control unit for, when the connection pattern change forbidding unit does not forbid the switch means to which it belongs to change its connection pattern and a connection pattern change request is sent from the traffic amount measuring means, selecting an internal path other than the internal path currently connected to the ring branch network via the port, and changing the connection pattern of the switch means to which it belongs so as to connect the selected internal path with the ring branch network.

7. The ring network concentrator of claim 6, wherein the environmental information in the environmental information storage describes if any of the ports is directly connected to the switch means to which the environmental information storage belongs; if any of the ring networks is linked to the port which is directly connected to the switch means; whether the ring network linked to the port is the ring branch network or the ring trunk network; and to which internal path the ring network linked to the port is connected.

8. The ring network concentrator of claim 6, further comprising:

packet relay means, having a media access control unit at each of its two terminals for inputting and outputting the packets, for transferring packets inputted by the media access control unit at one of its terminals to the other terminal and for relaying the packets, via the media access control unit at the other terminal, on an external line connected to the media access control unit; and a plurality of pairs of assistant switch means disposed in series in each of the internal paths;

wherein one of the media access control units is connected to one of each pair of assistant switch means and the other media access control unit is connected to another assistant switch means in each pair of assistant switch means, and wherein there are a number of connection configurations for all of the assistant switch means for deciding from which one of the internal paths a packet is transferred to the packet relay means and to which one of the internal paths a packet transmitted from the packet relay means is transferred, with a connection configuration in use being changed in accordance with the monitoring result of the transfer packet monitoring means.

9. The ring network concentrator of claim 8, wherein the switch means associated with the port which is connected to the ring branch network selects a connection pattern so as to connect the ring branch network to a ring network, other than the ring trunk network to which the ring branch network had been connected, for which relaying via the packet relay unit to the ring trunk network is possible.

10. The ring network concentrator of claim 1, wherein the transfer packet monitoring means is a communication protocol recognition means for recognizing a communication protocol of a packet to be transferred.

11. The ring network concentrator of claim 10, wherein the ring networks comprise a ring trunk network and a ring branch network.

12. The ring network concentrator of claim 11, wherein the ring trunk network comprises dual rings; and the internal paths comprise a main path connected to one of the dual rings, a sub path connected to the other of the dual rings, and at least one spare path.

13. The ring network concentrator of claim 12, wherein the communication protocol recognition means comprises:

a protocol recognition unit for recognizing a communication protocol of a packet to be transferred for each internal path;

a protocol information storage for storing communication protocol information which demands to change the connection patterns; and a connection pattern change request output unit for requesting a change in the connection patterns of all the switch means when the recognized communication protocol coincides with the communication protocol which demands to change the connection patterns.

14. The ring network concentrator of claim 13, wherein each of the plurality of switch means comprises:

an environmental information storage for storing current environmental information about the switch means to which it belongs;

a connection pattern change forbidding unit for forbidding the switch means to which it belongs to change the connection pattern unless it is associated with the port connected to the ring branch network;

a terminal station communication protocol recognition unit for recognizing a communication protocol of a packet sent from a terminal station on the ring network connected to the port associated with the switch means; and a connection pattern change control unit for controlling the change of the connection pattern of the switch means to which it belongs when the connection pattern change request is received from the communication protocol recognition means, and a communication protocol included in the connection pattern change request coincides with the communication protocol recognized by the terminal station communication protocol recognition unit.

15. The ring network concentrator of claim 14, wherein the terminal station protocol recognition unit comprises:

a copy element for copying a packet passing through an upstream line and a downstream line of the ring network connected to the port associated with the switch means to which the terminal station protocol recognition unit belongs, the upstream line being upstream of the downstream line with respect to a packet transfer direction;

a preset packet detection element for comparing copies of the packets which pass through both the upstream line and the downstream line and, when finding the copies to be of a same packet, for detecting a packet which passes through the upstream line after having passed through the downstream line; and a communication protocol judgement and output element for judging that the packet detected by the preset packet detection element is sent from a terminal station connected to the ring network to which the upstream and the downstream lines belong, for recognizing the communication protocol and outputting information in the detected packet, wherein upstream for a packet refers to a direction whereby a packet enters the ring network having passed through the port, while downstream for a packet refers to an opposite direction.

16. The ring network concentrator of claim 15, further comprising:

packet relay means, having a media access control unit at each of its two terminals for inputting outputting the packets, for transferring packets inputted by the media access control unit at one of its terminals to the other terminal and for relaying the packets, via the media access control unit at the other terminal, on an external line connected to the media access control unit; and a plurality of pairs of assistant switch means disposed in series in each of the internal paths;

wherein one of the media access control units is connected to one of each pair of assistant switch means and the other media access control unit is connected to another assistant switch means in each pair of assistant switch means, and wherein there are a number of connection configurations for all of the assistant switch means for deciding from which one of the internal paths a packet is transferred to the packet relay means and to which one of the internal paths a packet transmitted from the packet relay means is transferred, with a connection configuration in use being changed in accordance with the monitoring result of the transfer packet monitoring means.

17. The ring network concentrator of claim 16, wherein the switch means associated with the port which is connected to the ring branch network selects a connection pattern so as to connect the ring branch network to a ring network, other than the ring trunk network to which the ring branch network had been connected, for which relaying via the packet relay unit to the ring trunk network is possible.

18. A ring network concentrator to which a plurality of ring networks are connected and which builds a network system of the ring networks, the ring network concentrator comprising:

a plurality of ports for receiving packets from the ring networks and transmitting packets to the ring networks;

a plurality of internal paths for transferring packets within the ring network concentrator;

a traffic amount measuring means for measuring a traffic amount of the packets to be transferred via the internal paths; and a plurality of switch means for changing a connection pattern between the ring networks and the internal paths depending on the traffic amount.

19. The ring network concentrator of claim 18, wherein the ring networks comprise a ring trunk network and a ring branch network, in which the ring trunk network comprises dual rings and the ring branch network has a single ring; and the internal paths comprise a main path connected to one of the dual rings, a sub path connected to the other of the dual rings, and at least one spare path.

20. The ring network concentrator of claim 19, wherein the traffic amount measuring means comprises a path traffic amount measuring unit for measuring a traffic amount on each internal path, a comparing unit for comparing the measured traffic amount from the path traffic amount measuring unit with a threshold value, and a change request output unit for outputting a change request which requests the plurality of switch means to change the connection pattern when the measured traffic amount exceeds the threshold value.

21. The ring network concentrator of claim 20, wherein each of the switch means comprises:

an environmental information storage for storing current environmental information about the switch means to which it belongs;

a connection pattern change forbidding unit for forbidding the switch means to which it belongs to change the connection pattern unless it is associated with the port connected to the ring branch network; and a connection pattern change control unit for, when the connection pattern change forbidding unit does not forbid the switch means to which it belongs to change the connection pattern and a connection pattern change request is sent from the traffic amount measuring means, selecting an internal path other than the internal path currently connected to the ring branch network via the port, and changing the connection pattern of the switch means to which it belongs so as to connect the selected internal path with the ring branch network.

22. The ring network concentrator of claim 21, wherein the environmental information in the environmental information storage describes if any of the ports is directly connected to the switch means to which the environmental information storage belongs; if any of the ring networks is linked to the port which is directly connected to the switch means; whether the ring network linked to the port is the ring branch network or the ring trunk network; and to which internal path the ring network linked to the port is connected.

23. The ring network concentrator of claim 21, further comprising:

packet relay means, having a media access control unit at each of its two terminals for inputting and outputting the packets, for transferring packets inputted by the media access control unit at one of its terminals to the other terminal and for relaying the packets, via the media access control unit at the other terminal, on an external line connected to the media access control unit; and a plurality of pairs of assistant switch means disposed in series in each of the internal paths;

wherein one of the media access control units is connected to one of each pair of assistant switch means and the other media access control unit is connected to another assistant switch means in each pair of assistant switch means, and wherein there are a number of connection configurations for all of the assistant switch means for deciding from which one of the internal paths a packet is transferred to the packet relay means and to which one of the internal paths a packet transmitted from the packet relay means is transferred, with a connection configuration in use being changed in accordance with the monitoring result of the transfer packet monitoring means.

24. The ring network concentrator of claim 23, wherein the switch means associated with the port which is connected to the ring branch network selects a connection pattern so as to connect the ring branch network to a ring network: other than the ring trunk network to which the ring branch network had been connected, for which relaying via the packet relay unit to the ring trunk network is possible.

25. A ring network concentrator which is connected to a plurality of ring networks, and builds a network system of the ring networks, the ring network concentrator comprising:

a plurality of ports each for receiving packets from the ring network and transmitting packets to the ring network;

a plurality of internal paths for transferring packets within the ring network concentrator;

a communication protocol recognition means for recognizing a communication protocol of the packet transferred via the internal path; and a plurality of switch means each for changing its connection pattern between the ring network and the internal path depending on the recognition result of the communication protocol recognition means.

26. The ring network concentrator of claim 25, wherein the ring networks comprise a ring trunk network and a ring branch network, in which the ring trunk network comprises dual rings and the ring branch network has a single ring; and the internal paths comprise a main path connected to one of the dual rings, a sub path connected to the other of the dual rings, and at least one spare path.

27. The ring network concentrator of claim 26, wherein the communication protocol recognition means comprises:

a protocol recognition unit for recognizing a communication protocol of a packet to be transferred for each internal path;

a protocol information storage for storing communication protocol information which demands to change the connection patterns; and a connection pattern change request output unit for requesting a change the connection patterns of all the switch means when the recognized communication protocol coincides with the communication protocol which demands to change the connection patterns.

28. The ring network concentrator of claim 27, wherein each of the plurality of switch means comprises:

an environmental information storage for storing current environmental information about the switch means to which it belongs;

a connection pattern change forbidding unit for forbidding the switch means to which it belongs to change the connection pattern unless it is associated with the port connected to the ring branch network;

a terminal station communication protocol recognition unit for recognizing a communication protocol of a packet sent from a terminal station on the ring network connected to the port associated with the switch means; and a connection pattern change control unit for controlling the change of the connection pattern of the switch means to which it belongs when the connection pattern change request is received from the communication protocol recognition means, and a communication protocol included in the connection pattern change request coincides with the communication protocol recognized by the terminal station communication protocol recognition unit.

29. The ring network concentrator of claim 28, wherein the terminal station protocol recognition unit comprises:

a copy element for copying a packet passing through an upstream line and a downstream line of the ring network connected to the port associated with the switch means to which the terminal station protocol recognition unit belongs, the upstream line being upstream of the downstream line with respect to a packet transfer direction;

a preset packet detection element for comparing copies of the packets which pass through both the upstream line and the downstream line and, when finding the copies to be of a same packet, for detecting a packet which passes through the upstream line after having passed through the downstream line; and a communication protocol judgement and output element for judging that the packet detected by the preset packet detection element is sent from a terminal station connected to the ring network to which the upstream and the downstream lines belong, for recognizing the communication protocol and outputting information in the detected packet, wherein upstream for a packet refers to a direction whereby a packet enters the ring network having passed through the port, while downstream for a packet refers to an opposite direction.

30. The ring network concentrator of claim 29, further comprising:

packet relay means, having a media access control unit at each of its two terminals for inputting and outputting the packets, for transferring packets inputted by the media access control unit at one of its terminals to the other terminal and for relaying the packets, via the media access control unit at the other terminal, on an external line connected to the media access control unit; and a plurality of pairs of assistant switch means disposed in series in each of the internal paths;

wherein one of the media access control units is connected to one of each pair of assistant switch means and the other media access control unit is connected to another assistant switch means in each pair of assistant switch means, and wherein there are a number of connection configurations for all of the assistant switch means for deciding from which one of the internal paths a packet is transferred to the packet relay means and to which one of the internal paths a packet transmitted from the packet relay means is transferred, with a connection configuration in use being changed in accordance with the monitoring result of the transfer packet monitoring means.

31. The ring network concentrator of claim 30, wherein the switch means associated with the port which is connected to the ring branch network selects a connection pattern so as to connect the ring branch network to a ring network, other than the ring trunk network to which the ring branch network had been connected, for which relaying via the packet relay unit to the ring trunk network is possible.

\* \* \* \* \*